United States Patent [19]
Baker

[11] Patent Number: 6,081,852
[45] Date of Patent: Jun. 27, 2000

[54] PACKET DATA TRANSFERRING SYSTEM FOR AUTONOMOUSLY OPERATING A DMA BY AUTONOMOUS BOOT MODE SELECT SIGNAL WHEREIN THE DMA IS ENABLED TO AT LEAST ONE PROGRAM CONTROL LIST

[75] Inventor: Richard T. Baker, Austin, Tex.

[73] Assignee: Texas Instruments Incorporated, Dallas, Tex.

[21] Appl. No.: 08/840,690

[22] Filed: Apr. 29, 1997

Related U.S. Application Data

[60] Provisional application No. 60/016,518, Apr. 30, 1996.
[51] Int. Cl.$^7$ ................................................ G06F 13/28
[52] U.S. Cl. ........................ 710/24; 710/10; 710/26; 713/1
[58] Field of Search ................................. 395/842, 844, 395/847; 370/402; 710/24, 26, 10; 713/1

[56] References Cited

U.S. PATENT DOCUMENTS

| | | |
|---|---|---|
| 5,535,417 | 7/1996 | Baji et al. ........................ 710/22 |
| 5,621,902 | 4/1997 | Cases et al. ..................... 395/309 |
| 5,717,952 | 2/1998 | Christiansen et al. ............ 710/22 |
| 5,721,841 | 2/1998 | Szczepanek ..................... 395/310 |
| 5,768,612 | 6/1998 | Nelson ......................... 395/800.32 |
| 5,784,649 | 7/1998 | Begur et al. ................... 710/52 |
| 5,790,831 | 8/1998 | Lin et al. ....................... 395/500 |
| 5,794,069 | 8/1998 | Chisholm et al. ............... 395/822 |

*Primary Examiner*—Thomas C. Lee
*Assistant Examiner*—Ilwoo Park
*Attorney, Agent, or Firm*—J. Dennis Moore; Wade James Brady, III; Richard L. Donaldson

[57] ABSTRACT

A method and system for autonomously operation a PCI-serial bus interface device (20) in an autonomous mode includes directing circuitry (370) for directing an autonomous boot mode select signal to the data transfer device. Instructions configure registers (36, 38) associated with the data transfer device for autonomous operation of a data transfer device. The directing circuit (370) associates with the data packet transfer device for transferring data to at least one program control list (456) for operating said data packet transfer device in an autonomous mode.

20 Claims, 26 Drawing Sheets

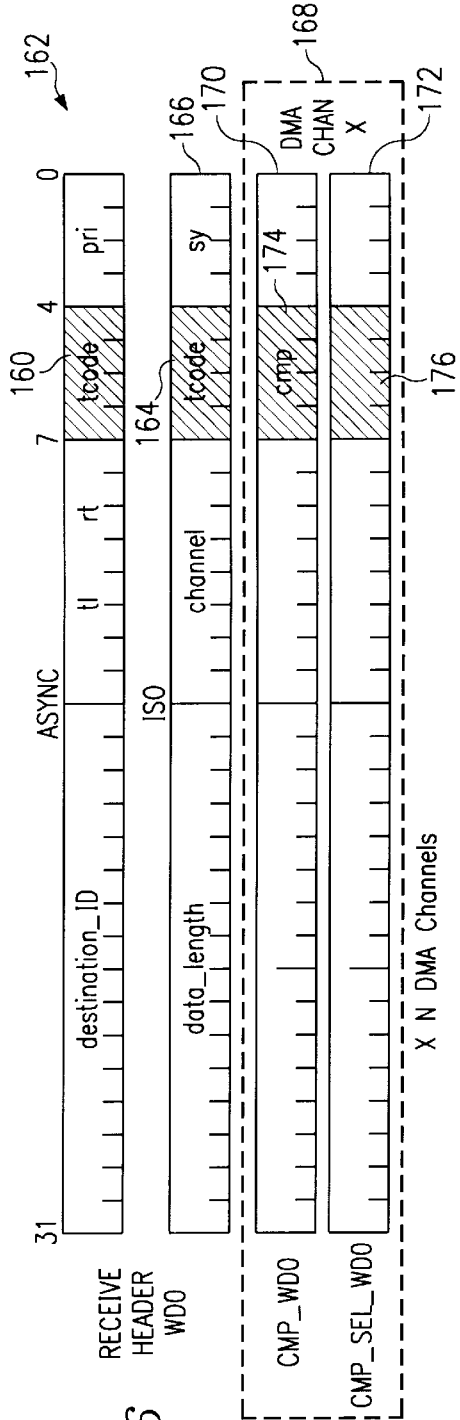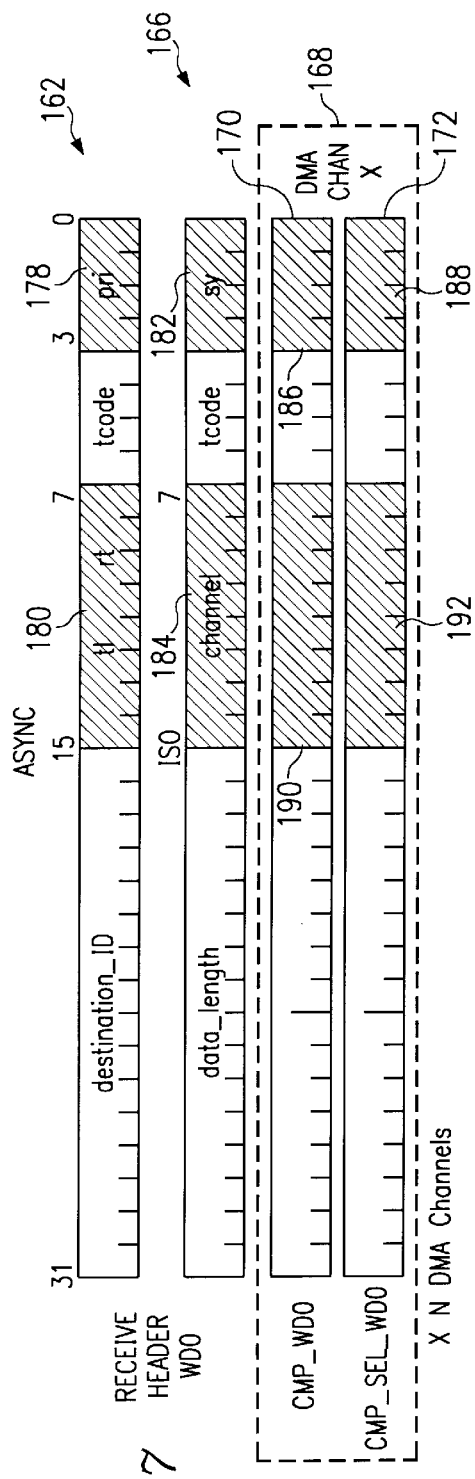

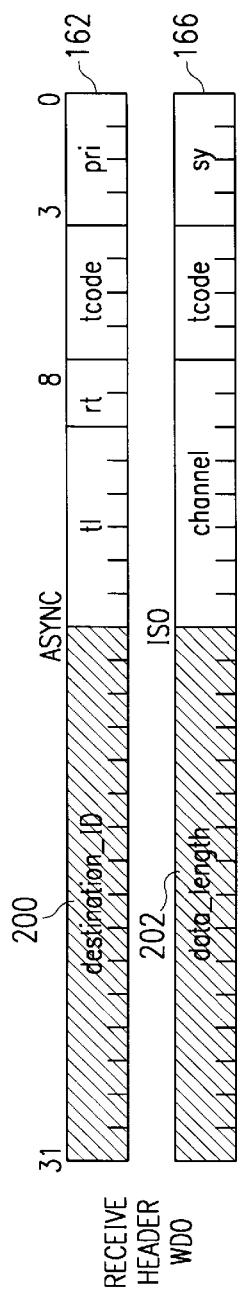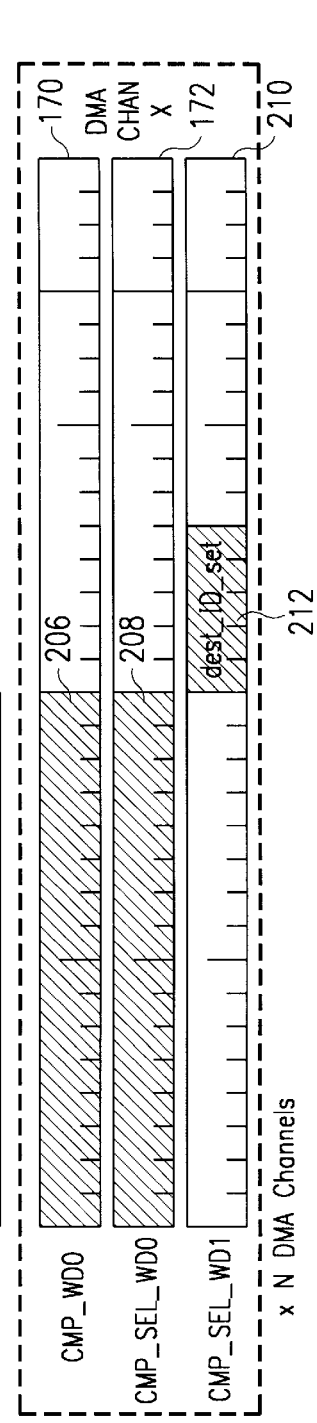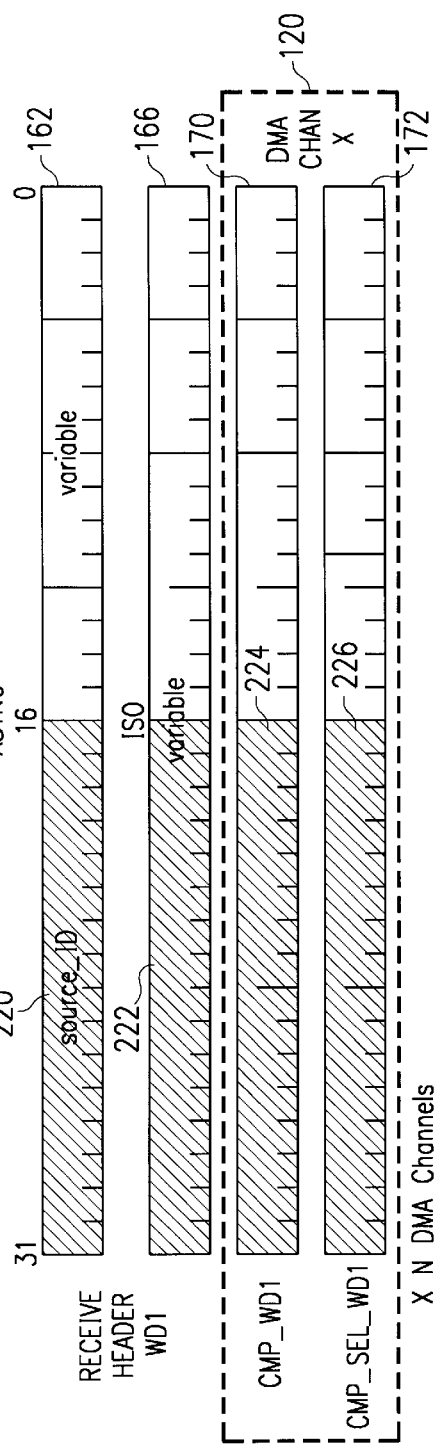
FIG. 8
FIG. 9

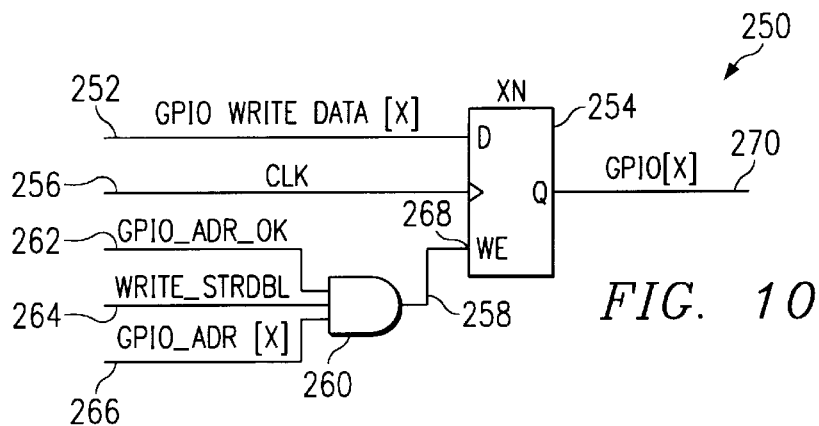

FIG. 10

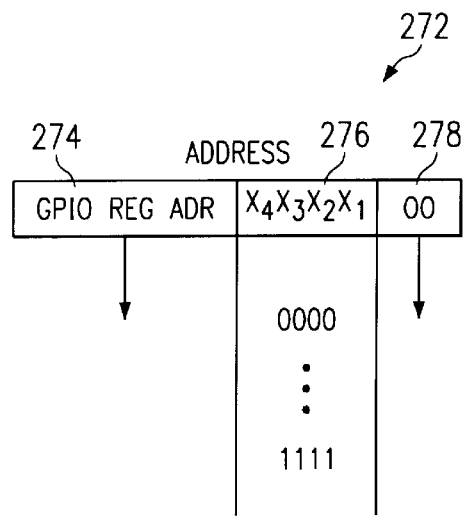

FIG. 11

| DMA CHANNEL | priority no. | 1394 transfer type |
|---|---|---|
| X | 0 (highest) | channel currently active on the 1394 bus |
| 0 | 1 | ISO receive/transmit ASYNC receive/transmit |
| 1 | 2 | ISO receive/transmit ASYNC receive/transmit |
| 2 | 3 | ISO receive/transmit ASYNC receive/transmit |
| 3 | 4 | ISO receive/transmit ASYNC receive/transmit |
| 4 | 5 | ISO receive/transmit ASYNC receive/transmit |
| 5 | 6 (lowest) | ISO receive/transmit ASYNC receive/transmit |

FIG. 13

| Internal PCI Address | | |
|---|---|---|
| adr[31] | adr[30] | Function |
| 0 | X | PCI memory Command |
| 1 | 0 | PCI I/O Command |
| 1 | 1 | PCI Configuration Command |

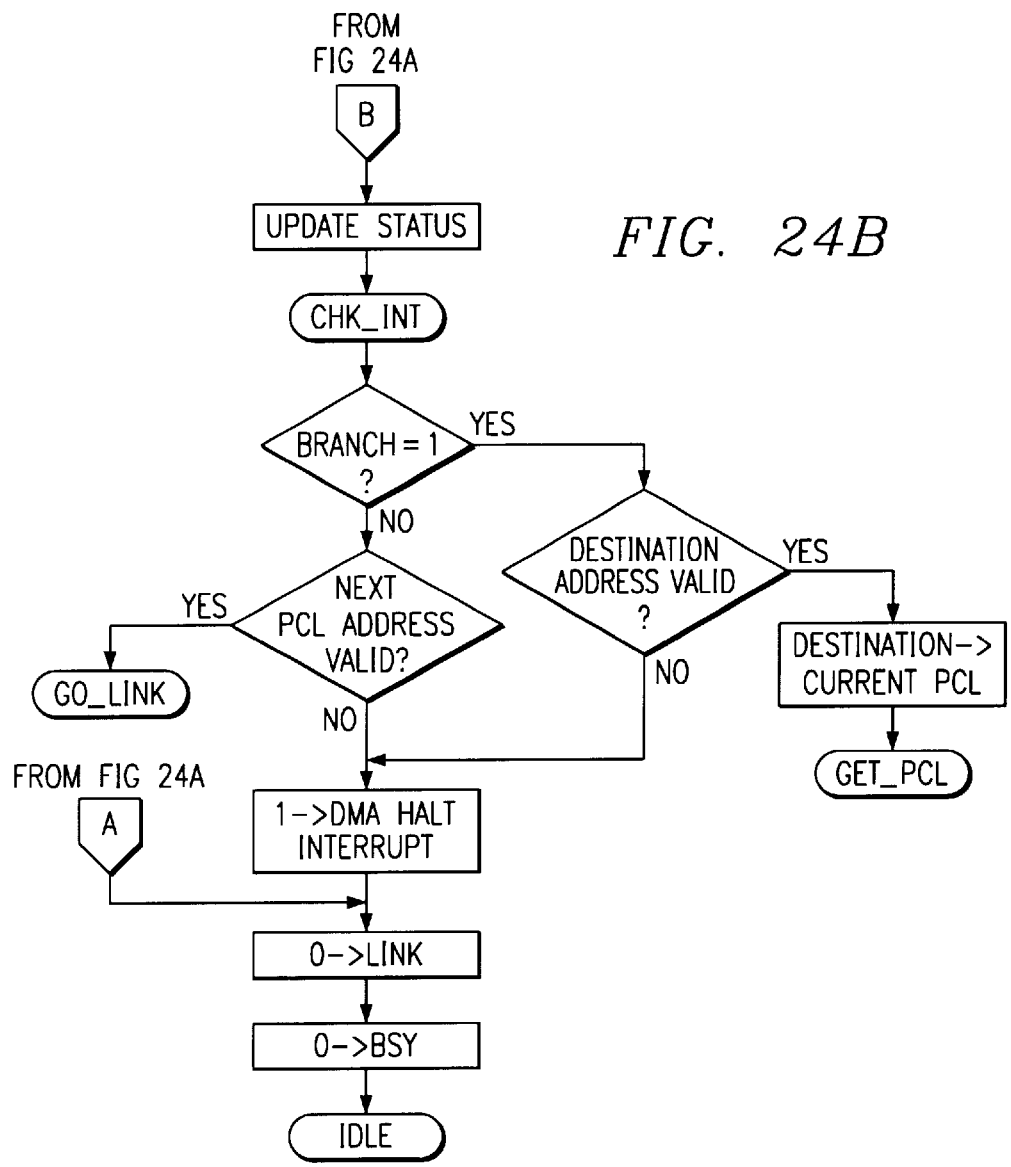

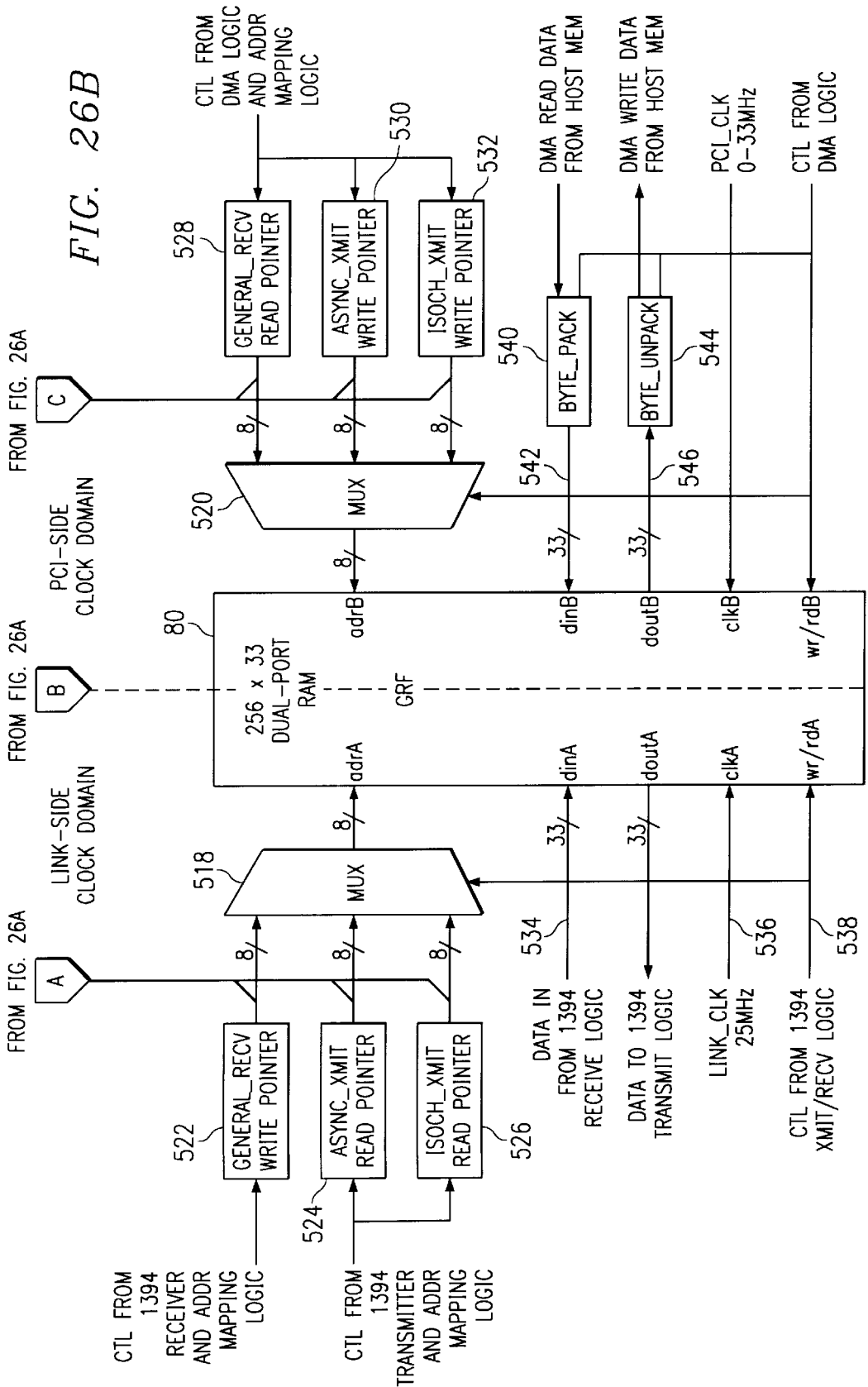

PACKET DATA TRANSFERRING SYSTEM FOR AUTONOMOUSLY OPERATING A DMA BY AUTONOMOUS BOOT MODE SELECT SIGNAL WHEREIN THE DMA IS ENABLED TO AT LEAST ONE PROGRAM CONTROL LIST

RELATED APPLICATIONS

This application claims priority under 35 U.S.C. 119(e)(1) of provisional application No. 60/016,518, filed Apr. 30, 1996.

TECHNICAL FIELD OF THE INVENTION

The present invention relates in general to the field of electronic devices, and, more particularly, to an improved platform-specific communications interface device, and, even more particularly, to a method and system for autonomously operating a PCI-serial bus interface device circuit of a packetized data communications interface device.

BACKGROUND OF THE INVENTION

For many multimedia applications, not only is processor speed important, but also input/output bandwidth is a critical factor that limits applications on personal computers. To address this limitation, the IEEE 1394 standard enables high-performance multimedia connections with camcorders, televisions, stereos, CD changers, set-top boxes, mixing consoles and music keyboards, as well as traditional personal computer devices. Also known as the "FireWire" standard, IEEE 1394 provides a bus interface standard for portable and desktop computing environments. The IEEE 1394 Standard serves as an important linking technology that bridges the consumer and computer markets and describes a serial bus driven by an advanced communication protocol. The IEEE 1394 serial bus is designed for low system cost, while providing the data transfer rates needed for high-performance peripheral buses.

Developed by the Institute of Electrical and Electronics Engineers (IEEE) and its list of member computer companies, the IEEE 1394 standard is a serial bus interface that enables low-cost, high-speed digital data transfer and communication. Transfer speeds between devices can reach up to 400 megabits per second (mbps) via both asynchronous and isochronous data transfer modes. The IEEE 1394 Standard interface lends itself to video applications because it operates an isochronous time-slice system. For example, if the system was configured to output one frame per $\frac{1}{15}$ seconds, at least one frame will exist in every packet that is sent out. This results in smooth looking video. For that reason, the IEEE 1394 Standard interface is highly compatible with technologies like asynchronous transfer mode (ATM) which also operates in an isochronous mode.

Benefits of the IEEE 1394 Standard are a real-time transmission of data that provides the benefit of an ideal interconnect for multimedia applications. Using a small, durable and flexible cable and cable connectors, the IEEE 1394 Standard generates cost savings and eliminates certain cable requirements. The IEEE 1394 Standard provides universal input/output interconnects that integrate input/output ports while consolidating printed circuit board space. Moreover, the IEEE 1394 Standard provides peer-to-peer communication structure that permits peripherals to communicate directly with each other without burdening the host unit.

The IEEE 1394 Standard provides a high speed serial bus that uses packetized data that includes a header. The header includes routing information. In addition, the packetized data includes payload data. Physical characteristics of the media are not necessarily designed for a long transmission distance. The IEEE 1394 Standard is designed for short distances such as local area networks that operate on a desktop bus. The distances are often longer than simply the desktop, but the IEEE 1394 Standard is not intended to be used for local area network operations. In essence, therefore, the IEEE 1394 Standard provides a high speed interconnect to replace serial buses and parallel buses for accessing devices such as workstations, home computers, televisions, VCRs, and camcorders with various media types such as audio, video and text.

Problems with existing PCI-interface includes the inflexibility of the PCI-interface device to operate in flexible modes of operation. For example, because of the processing capability of a PCI-interface device, operation is a stand-alone or autonomous mode would be desirable for a variety of application. This, however, is not possible with a known PCI-interface devices.

SUMMARY OF THE INVENTION

A need exists for a method and system that permits autonomous DMA operation in a PCI-interface device such as one complying with the IEEE 1394 Standard.

A need exists for a method and system that controls access to a DMA machine in a PCI-interface device such as one complying with the IEEE 1394 Standard to provide instruction sets for autonomous DMA operation functions.

A further need exists for a method and system for permitting a PCI-interface device such as one conforming to the IEEE 1394 Standard to perform PCI commands as a PCI master.

Still a further need exists for a method and system that permits reconfiguring an environment to power up autonomously and execute instructions without external intervention.

In accordance with the present invention, a method and system for autonomously operating a direct memory access circuit are provided that substantially eliminate or reduce disadvantages and problems associated with the previously developed methods and systems for operating DMA circuitry in an IEEE 1394 Standard or similar communications circuit.

According to one aspect of the present invention there is provided a method and system for operating a PCI-interface device such as one complying with the IEEE 1394 Standard in an autonomous mode. The method and system include directing an autonomous boot mode select signal to the PCI-interface device. The method and system configure registers that are associated with the PCI-interface device for autonomous operation. The invention forms at least one packet control list for controlling operation of the PCI-interface device in an autonomous mode. This enables a DMA device associated with the PCI-interface device to transfer data to an associated PCI-interface bus according to the packet control list. The present invention also includes fetching an address of a first program control list that uses DMA channel 0. In addition, the present invention enables the DMA master access to both an external RPL read only memory (ROM) and internal memory registers associated with the PCI-interface device.

A technical advantage of the present invention is that it provides a way that a data packet transfer device such as a PCI-interface device complying with IEEE 1394 Standard to operate in a stand-alone mode without needing an external processor. The present invention provides access so that a DMA engine may be reconfigured for a stand-alone operation.

Another technical advantage of the present invention is that it provides a way to select an "autoboot" mode of operation via an external option pin associated with the DMA engine.

Still another technical advantage of the present invention is that it provides a way to initialize the RPL ROM memory and SRAM base address registers to allow a direct memory access engine to read and write access after a power-up operation and in a stand-alone mode.

BRIEF DESCRIPTION OF THE DRAWINGS

A more complete understanding of the present invention and advantages thereof may be acquired by referring to the following description taken in conjunction with the accompanying drawings in which like referenced numerals indicate like features and wherein:

FIGS. 6 through 9 illustrate possible data values for matched data set fields applicable to the present invention;

FIG. 10 illustrates the one embodiment of the programmably selective write enable data flip flops of the present invention;

FIG. 11 provides an address field example for implementing the programmable bit select aspect of the present invention;

FIG. 13 provides a table for illustrating the assignment of priority based on the currently active channel;

FIGS. 24A–24B provide an exemplary auxiliary function flow diagram of the present invention;

FIGS. 26A–26B conceptually diagram, at a high level, the functions occurring in the FIFO circuits of the present invention.

DETAILED DESCRIPTION OF THE INVENTION

Preferred embodiments of the present invention are illustrated in the FIGUREs wherein like numerals refer to like and corresponding parts of the various drawings.

Figure 1:
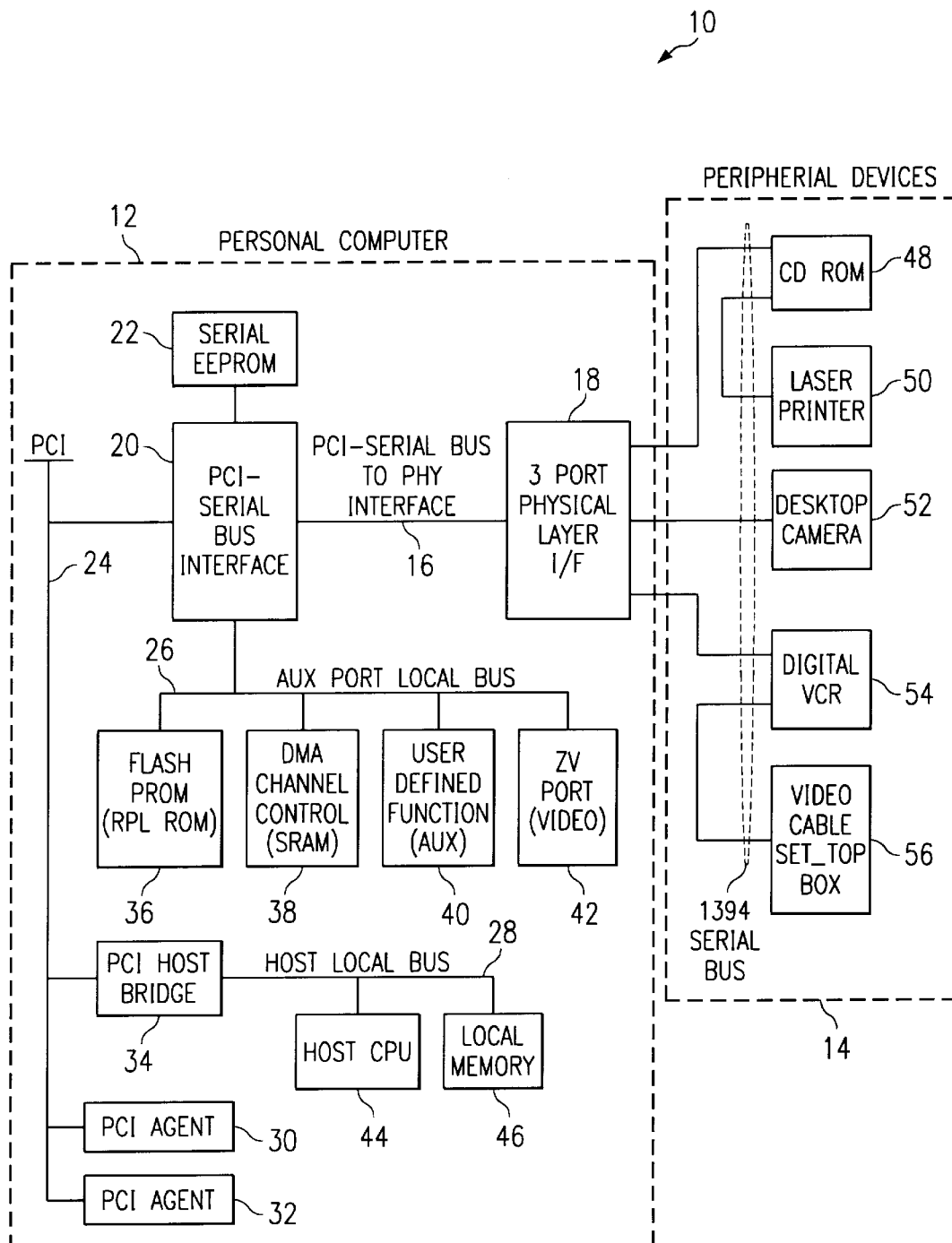
FIG. 1 illustrates an operational overview of the personal computer environment incorporating the present invention.

FIG. 1 conceptually illustrates personal computer environment 10 that includes a personal computer 12 that the dash-lined box 12 indicates and associated peripheral devices as indicated by dash-lined box 14. Within personal computer 12 there are various buses and nodes that control personal computer operations. For example, interface bus 16 supports communication with three-port physical layer interface 18 and interface device 20 of the present invention. Serial EPROM 22 supports operation of PCI-interface device 20. PCI-interface device 20 further interfaces with PCI bus 24 and auxiliary port local bus 26. Also communicating with PCI bus 24 are local bus 28 and PCI agents 30 and 32. PCI host bridge 34 performs host bridge functions between local bus 28 and PCI bus 24. Auxiliary port local bus 26 communicates with flash PROM (or RPL ROM) 36, direct memory access (DMA) channel control static RAM (SRAM) 38, user-defined function (AUX) 40, and zoom video (ZV) port 42 for video input and output. Host local bus 28 communicates with host CPU 44 and local memory 46.

Peripheral devices 14 that may communicate with physical layer interface device 18 may include CD ROM device 48, laser printer 50, desktop camera 52, and digital video cassette recorder (VCR) that interfaces with video cable set top box 56.

In FIG. 1, PCI-interface ASIC 20 performs a primary function of controlling transfer of data packets between devices operating in an environment that supports PCI bus 24 and devices operating in a high-speed input/output peripheral environment such as that which the IEEE 1394-1995 standard environment establishes. PCI-interface ASIC 20 of the present embodiment complies with IEEE standard 1394-1995 and with PCI specification revision 2.0. Moreover, PCI-interface ASIC 20 performs the function of a cycle master, particularly in the IEEE 1394-1995 environment, and has the ability to detect lost cycle start messages. PCI-interface ASIC 20 has the ability to generate 32-bit cyclical redundancy check (CRC) signals for transmission of IEEE 1394 standard packets, as well as to perform 32-bit CRC checking on receipt of IEEE 1394 packets. PCI-interface ASIC 20 supports an isochronouslation barrier between PCI-interface ASIC 20 and physical interface layer 18. Moreover, PCI-interface ASIC 20 supports IEEE 1394 transfer rates of 100, 200 and 400 mbps, as well as provides three size programmable FIFOs (e.g., ASynch transmit, Isochronous transmit, and general receive).

As discussed below, PCI-interface ASIC 20 provides programmable channel address comparator logic for receiving incoming data packets and assigning them to a DMA channel. The present invention provides, in at least one embodiment, five scatter-gather DMA channels where the data packet operation of each channel may be programmed to support (1) asynchronous packet transmissions, (2) isochronous packet transmissions, (3) asynchronous packet receive, and (4) isochronous packet receive functions.

PCI-interface ASIC 20 also provides PCI master bus functions to support DMA operations, as well as PCI slave functions for read and write access to internal registers. Implementing a 32-bit PCI address-data path, PCI-interface ASIC 20 provides, not only PCI address-data parity checking, but also software control for interrupt events. PCI-interface ASIC 20 provides a programmable external local bus for implementing a dedicated path to external logic. In addition, PCI-interface ASIC 20 provides an 8-bit or 16-bit interface to zoom video (ZV) port for transferring video data directly to an external motion video memory carrier.

Figure 2:
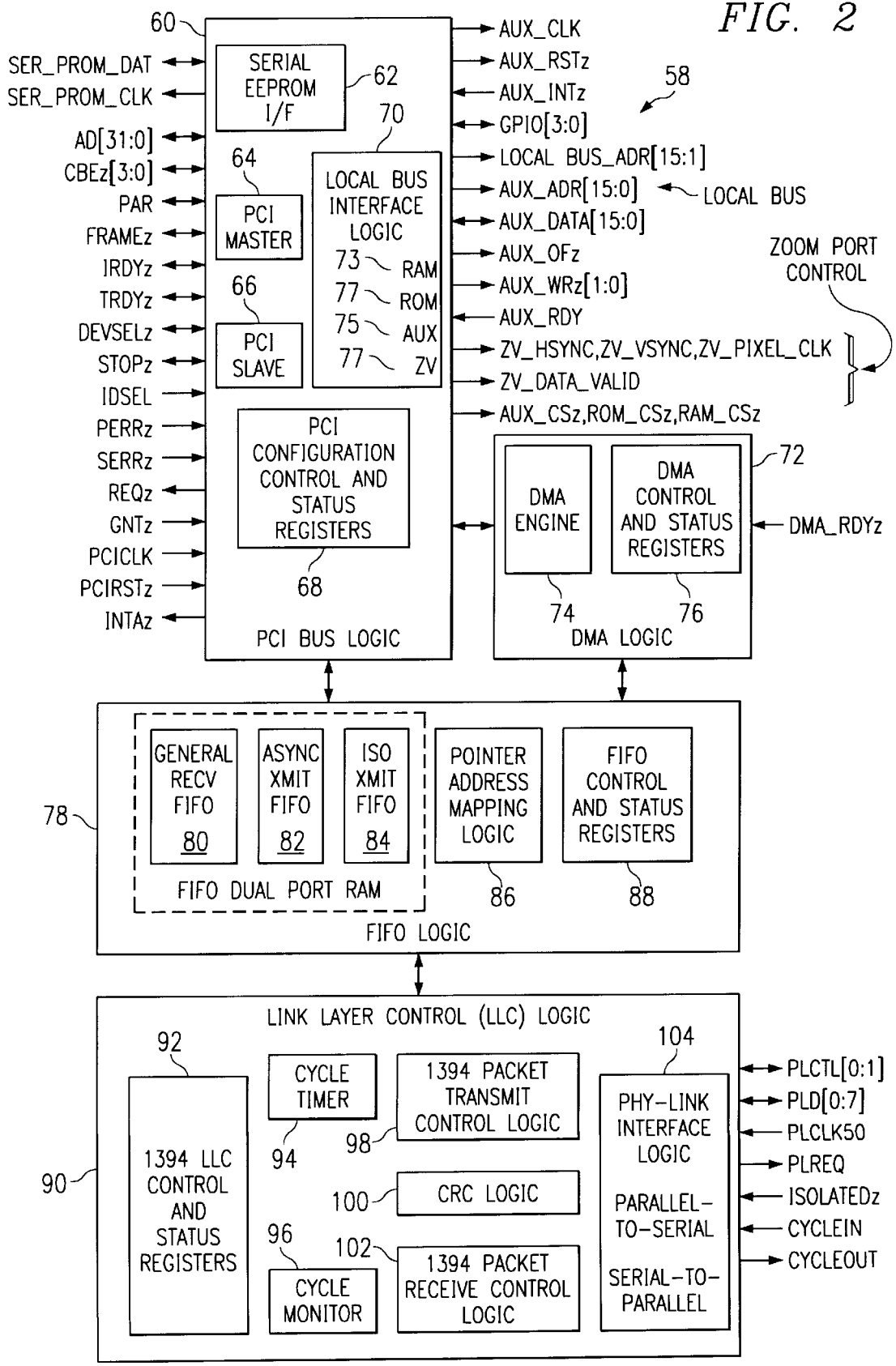
FIG. 2 provides a general operational overview of the functional logic of the present invention.

FIG. 2 provides block diagram 58 that shows the functional partitioning of PCI-interface ASIC 20 of the present invention. The logic within PCI-interface ASIC 20 includes PCI bus logic 60 that includes serial EPROM interface 62 for communicating with serial EPROM 22. PCI master logic 64 and PCI slave logic 66, as well as PCI configuration and control status register 68 provide the necessary logic for communications with PCI bus 24. Local bus interface logic 70 provides the necessary control logic for interfacing to auxiliary port local bus 26.

Within PCI-interface ASIC 20, DMA logic 72 includes DMA engine 74 and DMA control and status register 76 for controlling operations and communications with PCI bus logic 60 and FIFO logic 78. FIFO logic 78 includes general received FIFO 80, asynchronous transmit FIFO 82, ischronous transmit FIFO 84, pointer address mapping logic 86, and FIFO control and status registers 88.

Link layer control logic 90 includes control and status registers 92 that control and report status of all functions within the link layer control logic 90. Packet transmit control logic 98 and packet receive control logic 102 work with CRC logic 100, and cycle timer 94 and cycle monitor 96. Physical link interface logic 104 includes parallel-to-serial and serial-to-parallel functions.

In FIG. 2, PCI bus logic 60 implements the logic for interfacing PCI-interface ASIC 20 to PCI bus 24. PCI slave logic 66 provides the ability for external PCI agents to read and write slave interface control logic for assessing all of the PCI-interface 20 control and status registers 68, 76, 88, and 92 which are required by application software to control the operation of PCI-interface ASIC 20 and monitor its operational status. PCI master logic 64 provides to DMA logic 72 the ability to initiate data transfers over the PCI bus 24 as a master device. PCI configuration control and status registers 68 are usable by personal computer system 12 application software for configuring and programming PCI-interface ASIC 20. This includes the PCI-required control and base registers, as well as an interrupt control and status signal for PCI-interface ASIC 20 and miscellaneous control and status registers. Local bus interface logic 70 includes an auxiliary port to interface and control RAM, ROM, auxiliary functions, zoom video port, and four GPIO interfaces. Moreover, serial EEPROM interface 62 provides certain required PCI configuration data and constant system control register information after power-up.

Serial EEPROM interface 62 provides communication between PCI-interface ASIC 20 and serial EEPROM 22 (FIG. 1). In power up, serial EEPROM interface 62 initializes a small number of locations in the PCI configuration registers 68 from serial EEPROM 22. While the serial EEPROM state machine is accessing serial EEPROM 22, any incoming PCI slave access is terminated with retry status.

Serial EEPROM 22 also includes configuration data for PCI configuration control and status register 68. This information is read and written by host CPU 44 emulating a two-wire serial bus protocol through the control register for serial EEPROM 22. The two-wire serial bus is manipulated from host processor 44 by setting the serial EEPROM 22 output enable bit to a "1" in value, and then accessing the data and clock bits to emulate the two-wire serial bus protocol. PCI configuration control and status register 68 includes a timer bit for providing a time reference for timing the two-wire serial bus protocol events.

PCI master logic 64 implements the control required for PCI-interface ASIC 20 to operate on PCI bus 24 as a master device. This logic permits the operation of memory reads, memory writes, memory read line, and memory write line and write-invalidate instructions. For the memory read function, PCI-interface ASIC 20 DMA read operation results in a memory read of memory read line command on the PCI bus. For the memory write operation, PCI-interface ASIC 20 DMA write operation results in a PCI memory write, memory write line or a memory write invalidate command on the PCI bus.

PCI slave logic 66 performs the control logic necessary for PCI-interface ASIC 20 to operate on the PCI bus as a slave device. When enabled, PCI slave function 66 responds to memory read or write commands at PCI memory address ranges specified by base address registers contained in 68. PCI slave logic 66 performs slave burst transfers when enabled by the slave burst bit in the miscellaneous control register. PCI slave logic 66 performs posted write operations when enabled by a control bit in the miscellaneous control register.

PCI configuration control and status registers 68 provide system and application software with the capability to perform the PCI operational configuration of PCI-interface ASIC 20.

Local bus interface logic 70 provides a group of special input/output ports that share common logic. These ports are accessible from either PCI bus 24 or DMA engine 74. External devices on these ports cannot function as master devices. These ports allow PCI-interface ASIC 20 to connect to external devices or interfaces for providing autonomous data transfers between such devices. All local bus interfaces, except the zoom video bus interface, are synchronous to a local clock, which is an offered version of the PCI clock. The ZV port clock is programmed to be based on versions of the PCI clock, the IEEE 1394 clock, or an external clock.

Local bus interface logic 70 provides a shared local address bus which, in the present embodiment, is a 16-bit address bus, and a shared 8-bit or 16-bit read or write data bus with programmable wait-states and ready conditions. The local bus addresses and data buses are shared among the ROM, RAM, AUX, and ZOOM port functions. Also, the ZV output port provides horizontal synch, vertical synch data valid, and ZV-PIXEL.CLR. Other input and output for local bus interface logic 70 includes four general purpose I/O (GPIO) pins that feature programmable direction and polarity functions. Miscellaneous signals in the present embodiment of local bus interface logic 70 include local bus clock output, reset output, interrupt input, and external ready input. PCI configuration control and status registers 68 provide the necessary control instructions and information for operational configuration of local bus interface logic 70.

PCI interface ASIC 20 includes a remote program load (RPL) read-only memory (ROM) that provides to personal computer 12 the ability to read boot code from an attached RPL ROM. This allows the system to boot from an IEEE 1394 device, even though the system may lack specific IEEE 1394 boot code at power-reset. Additionally, ROM interface will be generalized to provide functionality beyond accessing the RPL ROM alone. Local bus interface logic 70 supports PCI slave and internal DMA read/write access to devices such as flash PROM 36, SRAM 38 and other RAM-like devices that appear in FIG. 1. ROM access is controlled by PCI configuration control and status registers 68 and is enabled by writing a 1 to the least significant bit of ROM base address register. A ROM interface may be configured as either an 8-bit or 16-bit wide data, a specified number of wait-states or similar functions. ROM options are configured at power-reset via serial PROM 22 and enter via PCI slave accesses.

RAM interface is accessed through a second PCI memory based register within PCI configuration control and status register 68. This memory may be used for DMA control structures or data buffers or shared memory interface to other functions such as a digital signal processor. The RAM interface may be configured as either a 16-bit or 8-bit wide data, a specified number of wait-states, or external ready paced.

The auxiliary interface is a generic input/output port that may be accessed through a third PCI memory-based address register within PCI configuration control and status register 68. This port may be used to implement a high speed data path to external dedicated resources such as compression/decompression logic or video processor/frame buffers. If the ZV port is enabled, then a portion of the AUX address space is mapped to the ZV port. Otherwise, this space is available as part of the auxiliary address base in the preferred embodiment. In the present embodiment, auxiliary interface may be configured as either an 8-bit or 16-bit wide data, a specified number of wait-states, or external ready paced.

FIFO logic is designed around a single 256×33 clocked dual-port ram in the preferred embodiment, which is partitioned into three logical FIFOs. Each FIFO is be programmable in size from 0 to 256 words. For a given combination of FIFO sizes, the sum total of the three FIFO sizes shall be less than or equal to 256 words.

General receive FIFO (GRF) 80 includes a read and write pointer pair for use in accessing the FIFO dual port RAM. Each pointer counts in the range from 0 to its fifo_size_value minus 1. The FIFO RAM addressing range for each pointer is set by logic which generates an offset value. The offset shall be added to the value of the pointer to map it to a unique range of RAM addresses. The read pointer shall be used by the active DMA channel to read asynchronous or isochronous packets from the PCI-side of the RAM, and write them into host memory. The IEEE 1394 receiver uses the write pointer to write asynchronous or isochronous packets—received over the IEEE 1394 bus—into the link-side of the FIFO RAM. The two pointers are communicated to both sides of the FIFO RAM through synchronizer logic, since either side of the FIFO dual port RAM resides in different clock domains.

Asynchronous transmit FIFO 82 includes a read and write pointer pair for accessing the FIFO dual port RAM. Each pointer counts in the range from 0 to its fifo_size_value minus 1. The FIFO RAM addressing range for each pointer is set by logic which generates an offset value. The offset is added to the value of the pointer to map it to a unique range of addresses. The active DMA channel uses the write pointer to write asynchronous packets—that it reads from host memory—into the PCI-side of the RAM. The read pointer shall be used by the IEEE 1394 transmitter which uses the read pointer to read asynchronous packets from the link-side of the FIFO RAM, and transmit them over the IEEE 1394 bus. The two pointers are communicated to both sides of the FIFO RAM through a synchronizer logic, since either side of the FIFO dual port RAM resides in different clock domains.

Isochronous transmit FIFO 84 includes a read and write pointer for accessing the FIFO dual port RAM. Each pointer counts in the range from 0 to its fifo_size_value minus 1. The FIFO RAM addressing range for each pointer is be set by logic which generates an offset value. The offset is added to the value of the pointer to map it to a unique range of addresses. The active DMA channel uses the write pointer to write isochronous packets—that it reads from host memory—into the PCI-side of the FIFO RAM. The IEEE 1394 transmitter uses the read pointer to read isochronous packets from the link-side of the FIFO RAM and transmit them over the IEEE 1394 bus. The read and write pointers are communicated to both sides of the FIFO RAM through a synchronizer logic, since either side of the FIFO dual port RAM resides in different clock domains.

Pointer dual-port address mapping logic 86 uses the three size values from the FIFO size register to map each of the FIFO read-write pointer pairs to a unique range of addresses in the FIFO dual port RAM. The pointer address mapping function shall be generated in accordance with the equations as shown in the table below:

---
Read-Write Pointer Address Mapping Logic let ITF = Isochronous Transmit FIFO
let ATF = Asynchronous Transmit FIFC
let GRF = General Receive FIFO
Isochronous Transmit FIFO pointer RAM address = ITF_pointer_value (0 to (ITF_size−1)) + 0x00
Asynchronous Transmit FIFO pointer RAM address = ATF_pointer_value (0 to (ATF_size−1)) + ITF_size
General Receive FIFO pointer RAM address = GRF_pointer_value (0 to (GRF_size−1)) + (ITF_size + ATF_size)

---

FIFO Control and Status Registers 88 implement the control and status register set of the FIFO logic 78. FIFO Control and Status Registers 88 include a FIFO size register for setting the size of each logical FIFO. This register provides three size parameters for programming the size of isochronous transmit FIFO 84, asynchronous transmit FIFO 82 and General Receive FIFO 80. This register is accessed via a PCI-slave 66 read or write operation. A PCI-side FIFO pointer Write-Read port provides a PCI-slave 66 write-read port for software to fetch the current value of the PCI-side pointers or write a value to them. A link-side FIFO pointer Write-Read port provides a PCI-slave read port for software to fetch the current value of the link-side pointers or write a value to them. A General Receive FIFO POP-PUSH port may receive a 32-bit slave write to cause the data quadlet to be pushed onto the top of GRF 80. A 32-bit slave read from this port causes a data quadlet to pop off the top of GRF 80. An Asynchronous Transmit FIFO POP-PUSH port may receive a 32-bit slave write to this port to cause the data quadlet to be pushed onto the top of asynchronous transmit FIFO. A 32-bit slave read from this port causes a data quadlet to pop off the top of asynchronous transmit FIFO 82. An Isochronous Transmit FIFO POP-PUSH port may receive a 32-bit slave write to this port to cause the data quadlet to be pushed onto the top of isochronous transmit FIFO 84. A 32-bit slave read from this port causes a data quadlet to pop off the top of isochronous transmit FIFO 84. A FIFO Control Token Status Read Port provides a slave read to return the value of bit 32 of the last data quadlet that was popped from one of the three FIFO's that was previously accessed. FIFO Diagnostic test and control register provides a PCI-slave read-write port for software to configure the FIFO logic for diagnostic testing and control it's operation. Also, a Transmit FIFO Threshold register provides a PCI-slave read-write port for software to set the Transmit threshold for the ASynch and Isochronous transmit FIFO's.

CRC Logic 100 implements the logic for performing the functions, including generating a 32 bit auto-DIN CRC error code on the header part of the packet data stream generated by the transmitter logic. The transmitter inserts this code into data stream after the header. For packets which have a data payload, CRC logic 100 generates a 32 bit auto-DIN CRC error code on the data payload portion of the packet stream generated by the transmitter logic. The transmitter inserts this code at the end of the packet stream. CRC logic 100 generates a 32 bit auto-DIN CRC error code on the header part of an incoming packet data stream. If the computed code is equal to the header CRC code sent with the packet, then the receiver considers the header correct. In addition, CRC logic 100 generates a 32 bit auto-DIN CRC error code on the payload section of an incoming packet data stream. If the computed code is equal to the data CRC code sent with the packet, then the receiver considers the data payload correct.

The 1394 link layer logic 90 implements the IEEE 1394 Link Layer Control Logic (LLC) as specified in the IEEE 1394-1995 standard. This function controls the transmission and reception of IEEE 1394 packet data between the FIFO logic 78 and other devices on the IEEE 1394 bus.

The 1394 link layer control and status register 92 implement the control and status register logic required by application software to control the operation of the LLC and monitor its operation. A 1394 bus number-node number register provides the interface for application software to program the bus and node numbers. A 1394 link layer control register provides the interface for application software to control the operating mode of the LLC. A 1394 Link Layer Interrupt Status Register provides the interface for application software to decode the cause of interrupts generated by the LLC and provide a mechanism for clearing the interrupt status. A 1394 Link Layer Interrupt Enable register provides the interface for application software to selectively enable the status bits in the interrupt status register to generate a LLC interrupt or disable them from generating a LLC interrupt. A 1394 Cycle Timer Register provides the interface for application software to program the cycle timer with an initial value or to read its current value. When the LLC is operating as a cycle master, this timer shall be used to time the transmission of cycle start packets every 125 microseconds. A 1394 Physical Layer Access Register provides the interface for application software to write data to or read data from the Physical Layer I/F 18 control and status registers.

A 1394 diagnostic test control register provides the interface for application software to perform diagnostic testing of the 1394 LLC logic. The 1394 link layer control and status registers 92 also include DMA Channel 4-0 Word 0 receive packet compare value registers. Each register is assigned to a DMA channel comparator logic function. The DMA channel comparator matches a selected set of bit positions in the compare value register, to corresponding bit positions of the first quadlet (word 0) of the incoming packet. The bit positions to match are specified by the mask value contained in the word 0 receive packet compare mask register. A DMA channel 4-0 word 0 receive packet compare mask register is assigned to a corresponding DMA channel comparator. The DMA channel compare logic uses the mask value in this register to select the bit positions in word 0 that will be matched against corresponding bit positions in the word 0 receive compare value register. The DMA Channel 4-0 Word 1 receive packet compare value registers are assigned to a DMA channel comparator logic function. The DMA channel comparator matches a selected set of bit positions in the compare value register to corresponding bit positions of the second quadlet (word 1) of the incoming packet. The bit positions to match are specified by the mask value contained in the word 1 receive packet compare mask register. Also, a DMA channel 4-0 word 1 receive packet compare mask register is assigned to the corresponding DMA channel comparator. The DMA channel compare logic uses the mask value in this register to select the bit positions in word 1 that is matched against corresponding bit positions in the word 1 receive compare value register.

Moreover, 1394 link layer control and status registers 92 include a busy retry count register, the contents of which specify the number of times the 1394 transmitter should re-try the transmission of an ASynch packet when a busy acknowledge is received from the destination node. This register shall be read-write by application software via PCI slave access. A busy retry transmit time interval register contains the time interval that the transmitter must delay between successive re-try attempts, when a busy acknowledge signal is received for each attempt. This register is read-written by application software via PCI slave access. Also, there is a state machine vector register that provides software with the capability to monitor the state vector of each state machine implemented in the LLC. Furthermore, FIFO error counters count the under-runs that occur on the ASynch and Isochronous transmit FIFO's 82 and 84 during packet transmissions and the over-runs occurring on GRF 80 during packet reception.

Packet receiver control logic 102 implements the logic required to receive incoming IEEE 1394 packets. Receiver control logic conforms to the detail functional requirements as specified in IEEE 1394-1995. These include the following functions of using the bus and node ID registers and/or the DMA channel receive packet comparators to determine if an incoming asynchronous or isochronous packet is to be accepted. The CRC logic function verifies correct reception of an incoming packet by checking the header CRC. If the packet has a payload, the data CRC shall be checked, and received packets loaded into the GRF 80 if the packet passes the addressing and CRC checks. Packet receiver control logic 102 generates acknowledge on asynchronous receive packets.

Cycle timer logic 94 implements the logic for performing the cycle timer function. Cycle timer logic 94 conforms to the requirements of a cycle time function as specified in the IEEE 1394-1995 standard. The cycle timer contains the cycle counter and the cycle offset timer. The offset timer is free running, or reloaded on a low-to-high transition on a selected signal pin, or takes a reload value from the receiver, based on the state of the cyclemaster and cyclesource bits in 1394 LLC control and status registers 92. The cycle timer shall be used to support isochronous data transfers. The cycle time shall be 32 bits wide. In the present embodiment, the low order 12 bits count as a modulo 3072 counter, which increments once every 24.576 MHZ clock period, or (40.69 ns). The next 13 high order bits shall be a count of 8 khz (or 125 usec), and the highest 7 bits count in seconds.

Cycle monitor logic 96 implements the logic for performing the cycle monitor function. Cycle monitor logic 96 support isochronous data transfers to monitor the LLC activity and handle the scheduling of isochronous activity. When cycle monitor logic 96 receives or transmits a cycle start packet, cycle monitor logic 96 indicates the occurrence of these events by generating a cycle started or cycle received interrupt. Cycle monitor logic 96 also detects missing cycle start packets and generates a cycle lost interrupt. When an isochronous cycle is completed, cycle monitor logic 96 asserts a cycle done interrupt. Cycle monitor logic 96 signals the transmitted to send a cycle start packet when the cyclemaster enable bit is asserted in 1394 LLC control and status register 92.

1394 packet transmit control logic 98 implements the logic to control the movement of IEEE 1394 packets from either isochronous transmit FIFO 82 or asynchronous transmit FIFO 84 to PHY-LINK interface logic 104 for transmission over the IEEE 1394 bus. Transmit control logic 98 conforms to the functional requirements specified in the IEEE 1394-1995 Standard. Transmit control logic 98 formats the transmit packet formats.

The 1394 packet transmit control logic 98 unloads quadlets from asynchronous transmit FIFO 84, and correctly formats them into a 32-bit parallel 1394 asynchronous packet stream. Control logic 98 unloads quadlets from isochronous transmit FIFO 82 and correctly formats them into a 32-bit parallel 1394 isochronous packet stream. Using the CRC logic to compute a CRC code for the header and payload sections of a packet, control logic 98 inserts the CRC codes into packet stream in the time slot as required by the format of the packet being transmitted. The 1394 packet transmit control logic 98 inputs the parallel packet streams to the PHY-LINK interface logic for conversion from a parallel to a serial data stream format for transmission to the PHY.

The 1394 packet transmit control logic 98 transmits the cycle start packet when the LLC is programmed to operate as the cycle master. The 1394 packet transmit control logic 98 sends the 1394 transmit bus requests to the PHY. The PHY layer will arbitrate for the bus and send the indication to the transmitter to start transmitting when the BUS grant is received. The 1394 packet transmit control logic 98 executed re-try transmissions using the single phase retry X protocol as specified in the IEEE 1394-1995 Standard when a busy acknowledge is returned in response to an ASynch transmitted packet. In addition, the 1394 packet transmit control logic 98 sets the speed of packet transmission.

PHY-LINK interface logic 104 implements the logic for interfacing PCI-interface ASIC 20 to the physical layer chip. PHY-LINK interface logic 104 conforms to the requirements of the link-PHY interface specification in the IEEE 1394-1995 standard. This function provides PCI-interface ASIC 20 with access to the physical layer services. The PHY-LINK interface logic 104 uses packet speed code from the transmitter to select the number of serial data streams to generate. If the speed code is set for 100 mbps, the parallel data stream is converted into two serial data streams, each running at 50 mbps. If the speed code is set for 200 mbps, the parallel data stream is converted into four serial data streams each running at 50 mbps. PHY-LINK interface logic 104 uses a PHY receive speed indication to convert the incoming serial data streams from the PHY into a parallel data stream for input into the receiving control logic. For any incoming packet, the PHY will generate two serial data streams to PCI-interface ASIC 20, if it is receiving the packet at 100 mbps or four serial data streams, if it is receiving the packet at 200 mbps. The serial data streams are each clocked at 50 MHZ. PHY-LINK interface logic 104 detects and receives serial status responses from the PHY and converts them into a parallel format. The status responses convey PHY interrupt indications and/or return data in response to a PHY register read access request. PHY-LINK interface logic 104 detects and receives serial acknowledge packets and converts them into a parallel format. In addition, PHY-LINK interface logic 104 accepts transmitter packet transmit requests or PHY register read-write access requests and formats them into a serial request stream for transmission to the PHY. Moreover, PHY-LINK interface logic 104 may optionally operate with an electrical isochronouslation barrier between the PHY and PCI-linked devices.

DMA logic 72 uses PCI master logic 64 to acquire the PCI bus 24 and function as a master device. DMA logic 72 includes DMA engine 74 which includes a common state machine which is priority-time multiplexed. The DMA engine also contains arbitration logic for activating the channel based on assigned priority level. In addition, DMA control and status registers 76 provide serve each DMA channel along with the PCI slave 66 data path control for accessing these registers from PCI interface ASIC 20.

DMA engine 74 implements the state machine logic for fetching control parameters and data buffer pointers from the PCL. The state machine logic or packet processor uses these parameters to control the transfer of data to and from the data buffers.

Figure 3:
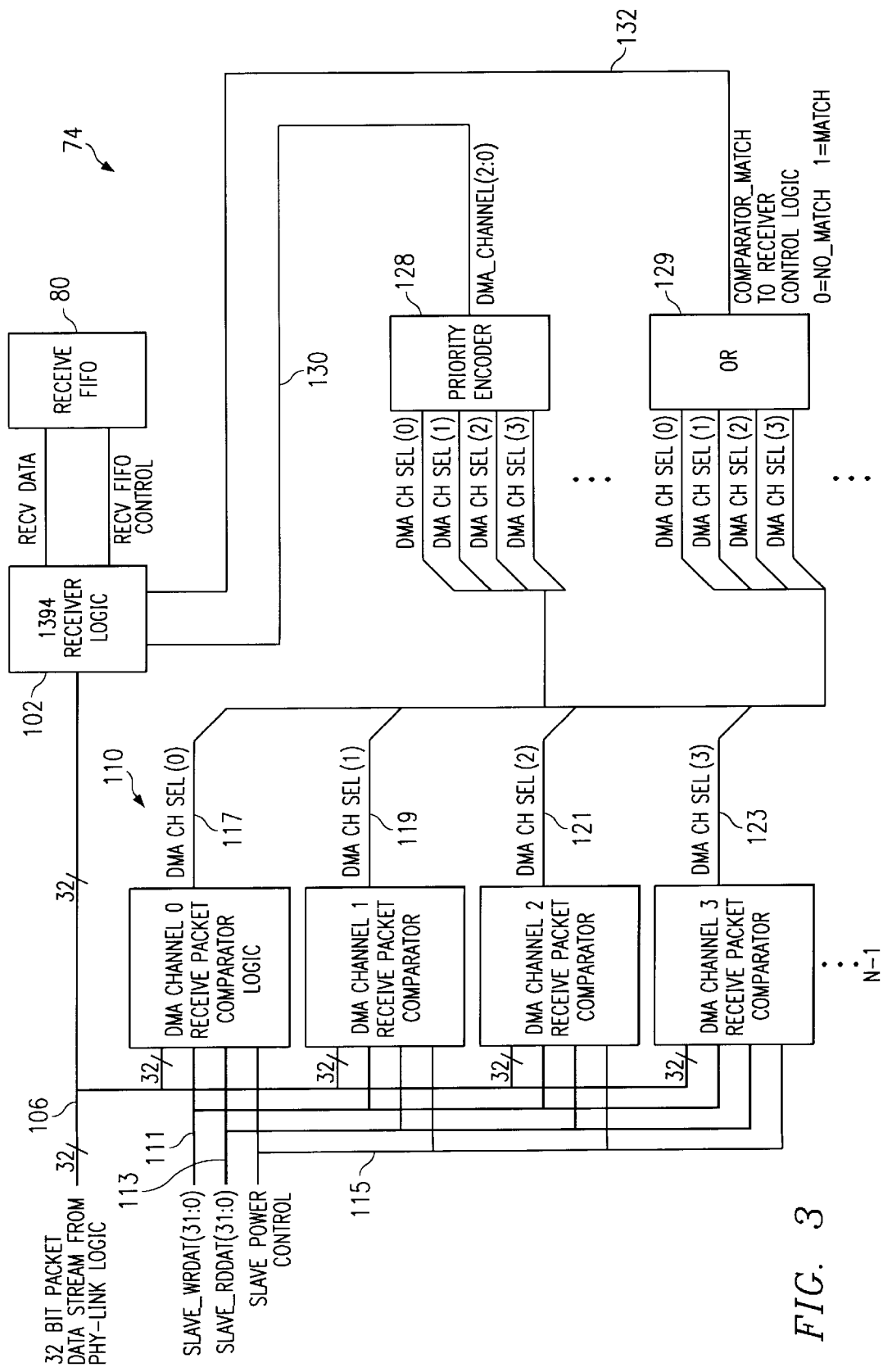
FIG. 3 illustrates a conceptual view of the comparator logic for the present invention.

FIG. 3 illustrates header compare logic contained in the 1394 packet receive logic 102, that receives 32-bit packet data stream 106 from PHY-LINK interface logic 104. 32-bit packet data stream 106 goes to IEEE 1394 receiver logic 102 and to the header compare logic indicated by reference numeral 110. Also, PCI slave 66 provides 32-bit read/write access to the comparator control registers contained in number 110. Line 117 indicates the header compare match output for DMA channel 0. Line 119 indicates the header compare match for DMA channel one. Line 121 shows the header compare match for DMA channel two. Line 123 shows the header compare match for channel three. Each of these outputs go to priority encoder 128 and logical OR circuit 129. Priority encoder 128 generates DMA channel output 130 that goes to 1394 receiver logic 102. The OR logic circuit 129 provides a comparator match to receiver control logic signal as a 0 indicating no match, or 1 indicating a match at line 132 which goes to 1394 receiver logic 102.

DMA engine 74 may be viewed as five (5) or more independent DMA channels that all run concurrently. The actual implementation uses one main control state machine to multiplex between the DMA channels over time. Priority superisochronous logic continuously examines the current context of all channels and assigns the channel with the highest priority having pending activity to the state machine for execution.

Figure 4:
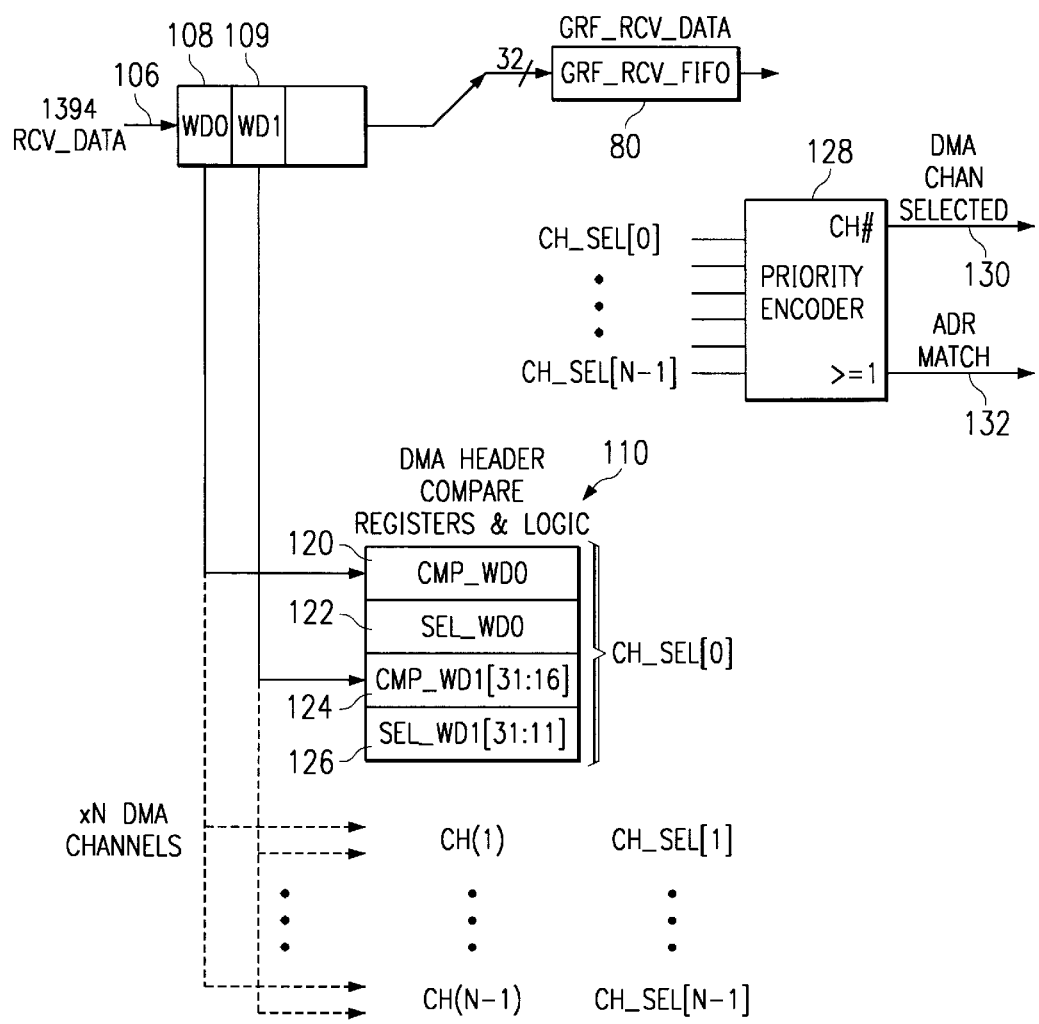
FIG. 4 provides a more detailed conceptual representation of the comparator logic of the present invention.

FIG. 4 illustrates in more detail the general concepts that FIG. 3 describes. In FIG. 4, receive data 106 includes header data 108 having words WD0 and WD1. Words WD0 and WD1 are provided to each of the N DMA channel header compare blocks of logic 110 (e.g., such as the four channels 0–3 of FIG. 3). DMA header compare registers for each DMA channel in logic 110 includes instructions in circuitry for comparing header WD 0 at 108 to match select register contents 120 and control values logic 122. Likewise, WD 1 at 109 is compared using compare instructions as indicated by content of register 124 and the contents of select register 126. The output of DMA header compare registers and logic is represented as channel select [0] through channel select [N−1]. FIG. 4 further indicates that priority encoder 128 receives these channel select outputs to produce a channel number at DMA channel selected line 130 and an address match output 132. As FIG. 3 and the accompanying text describe DMA channel selected output 130 and address match output 132 flow to IEEE 1394 receiver logic 102.

DMA header compare registers and logic 110 and priority encoder 128 implement the logic required to determine if an incoming packet is to be accepted and loaded into the GRF 80. FIG. 3 shows four DMA channels, that five or more DMA channels are within the scope of the invention. Each DMA header compare register and logic circuit 110 is assigned to service a DMA channel. A comparator includes a WD 0 field select register 122, a WD 1 select register 126, a WD 0 compare value register 120, a WD 1 compare value register 124 and compare isochronous logic. The two field select mask registers specify the bit fields in WD 0 and WD 1 of the incoming packet, that will be matched to an expected value by the comparator logic. The two compare value registers specify the expected bit patterns that will be matched against the selected bit fields in word 0 and word 1 of the incoming packet. Priority encoder 128 collects the DMA channel match indications from each DMA header compare register and logic 110 and generates a bit code that maps the incoming packet to a particular DMA channel. The OR logic circuit 129 combines the select indications from the DMA header compare registers and logic 110 and generates a single comparator match indication to IEEE 1394 receiver logic 102. The IEEE 1394 receiver logic uses the DMA channel number, and comparator match indication to determine if the incoming packet is to be received into GRF 80.

In the present embodiment, the DMA packet processor may operate as independent DMA channels all running concurrently. The actual implementation utilizes one main control state machine which multiplexes between the multiple DMA channels (e.g., five DMA channels) over time. Priority superisochronous logic continuously examines the current context of all channels and assigns the channel with the highest priority of pending activity to the state machine for execution. A DMA channel initializes after reset to a static condition where it is waiting for a valid PCL pointer to be written to the packet control list start address register, and the channel enable and link bits to be set in the DMA control register. A valid PCL pointer is determined by the state of bit zero of the packet control list start address register. A one indicates an invalid address, and a zero indicates a valid address. The DMA will then go to the address pointed to by the packet control list start address register, fetch the new address, and, if valid, will make this the current PCL address and begin execution.

If this address is invalid, the link bit is cleared in the DMA control register, a DMA halted interrupt is generated for this channel with associated status in the interrupt status register, and the channel goes inactive. This mechanism provides a sanity check on the PCL memory structures as well as provides a relatively easy way to continue channel PCL execution in the event that a next address link is missed. When a valid next PCL address is detected, the DMA will then set the BUSY bit in the DMA control register and fetch the first control words at the PCL offset. A check is then made to determine whether the command is a receive, transmit, PCI to/from local bus, or auxiliary command. From priority encoder 128, depending on which DMA channel has a match, the highest priority channel that has a match identifies a particular DMA channel to be selected.

Figure 5:
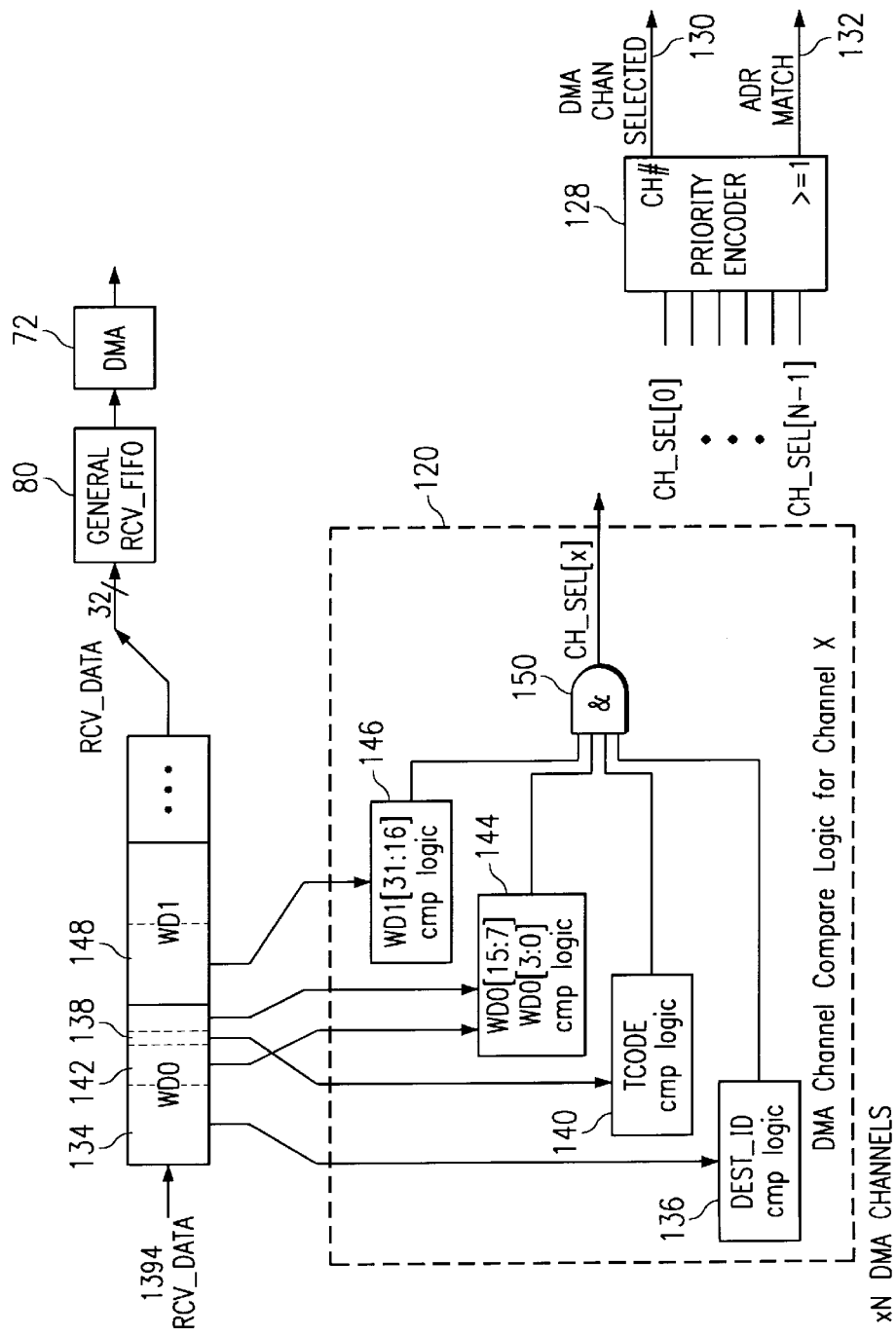
FIG. 5 illustrates in further detail the header comparator functions for packet receiver logic of the present invention.

FIG. 5 shows in yet further detail the operation of a given DMA channel header compare logic 120 according to the present embodiment. For example, receive data that includes words WD0 and WD1 goes to header compare logic 120. This includes having code segment 134 of word WD0 go to destination ID compare logic 136. WD0 portion 138 goes to tcode compare logic 140. WD0 portion 142 goes to compare logic 144 for WD0 bits 15:7 and 3:0. In addition, compare logic 146 receives bits 31:16 as indicated by WD1 portion 148. Compare logic outputs from destination ID compare logic 136, tcode compare logic 140, compare logic 144 operating on WD0 bits 3:0 and WD0 bits 15:6, as well as compare logic 146 output for WD1 bits 31:16 go to AND function 150. The output of AND function 150 is a channel select output [x] that may be channel select [0] through channel select [N−1] which priority encoder 128 receives as described above to produce DMA channel selected signal 130 and address match signal 132.

FIGS. 6, 7, 8 and 9 provide detailed views of the receive data bits that go to DMA channel header compare logic 120. In particular, FIG. 6 shows that T code 160 includes [7:4] of asynchronous header 162. Similarly, tcode bits 164 form bits [7:4] of isochronous header 166. In a given DMA channel, the match data set 168 includes match data header for WD0 at 170 corresponding to header WD 0 at 162 and select match data set 172 corresponding to header WD 0 at 166. As FIG. 6 illustrates, the [7:4] compare bits 174, as modified by [7:4] bits 176 of compare select WD 0 at 172, determines the match results for receive header WD 0, bits [7:4]. The output from this compare isochronous is ANDed with other partial compare isochronous results to determine the match value 117 for a particular DMA channel.

FIG. 6 shows a possible target data value layout for particular fields. The present invention takes receive data, one field at a time, and tries to show possible ways of setting the compare words and select words to receive a particular result. In particular, FIG. 6 shows the compare isochronous against the tcode 160 field. One of the tcodes 160 or 164 provides an operational code that identifies the data type on receive data bus 16 and 1394 serial data as isochronous or asynchronous data. In the example of FIG. 6, tcodes are in the same field. This compare isochronous operates on both asynchronous headers and isochronous headers in the same way. There may be different ways to decode isochronous and asynchronous headers. They may be as shown or may be merged together. Actual encoding may range, but behavior is similar in that we end up with a compare or not compare.

FIG. 7 highlights [3:0] bits 178 and [15:8] bits 180 of asynchronous header 162, as well as [3:0] synch bits 182 and [15:8] channel bits 184 of isochronous header 166. The [3:0] bits of header WD 0, either primary bits 178 or synch bits 182 are compared with [3:0] bits 186 of WD 0 at 170 as modified by [3:0] bits 188 of compare select WD 0 at 172. Moreover, [15:8] bits of header WD 0 at 170, either asynchronous header 162, [15:8] bits 180, or isochronous header 166, [15:8] bits 184, are compared to the [15:8] bits 190 of compare WD 0 at 170 as modified by [15:8] bits of compare select WD 0 at 172. The output from these matches occurring per FIG. 7 corresponds to the WD 0 bits [3:0] and [15:8] of compare logic 144 of circuit 110.

FIG. 8 shows a further compare isochronous corresponding to the destination ID compare logic circuit 136 of DMA channel compare logic 110. Asynchronous header 162 includes destination ID bits [31:16] designated by reference numeral 200. These same bit positions, [31:16] bits of header WD 0 at 166 contain data length bits [31:16] designated by reference numeral 202 for isochronous data packets. Likewise, bits [31:16] of a particular link layer control register 92, here designated by reference numeral 204 contain node number and bus number data. FIG. 8 depicts the compare isochronous of asynchronous receive header WD 0 at 162 or isochronous receive header WD 0 at 166 with match data set 170 bits 206 for [31:16] bits as modified by data set 172 bits 208. Match data set 210 includes bits [15:11] as destination ID set bits 212. Based on the compare isochronous that FIG. 8 produces, a DMA channel number is derived in logic block 146 that goes to AND function 150 of DMA channel compare logic 110.

The high order bits [31:16] of asynchronous header WD 0 can have special meaning because of the way that the IEEE 1394 Standard treats destination identifiers. For example, IEEE 1394 encoding designates broadcast type of messages to different headers. For the receive header, there is a compare word 0 and a bit select word 0 that allows one to select a specific receive header word. In addition, each bit in compare select word 1 [15:11] 212 selects individually a particular destination ID compare isochronous equation.

FIG. 9 shows asynchronous header 162 that includes sourceID bits [31:16] at 220. These bit locations 222 in an isochronous header 166 are part of variable data. In WD 1 compare logic 146, DMA channel 120 compares bits 16 through 31 of match data set 170 as modified by compare select word 1 bits [31:16] at 226 to header WD 1 bits [31:16] at 220 or 222.

FIG. 10 shows register write circuitry 250 for writing an arbitrary number of data register bits with a single register write operation. Circuitry 250 shows one of an arbitrary number of similar circuits. Each circuit controlling a particular bit out of the arbitrary number of data bits. In register write circuitry 250, general purpose I/O (GPIO) write data input 252 goes to data flip flop 254. Data flip flop 254 also receives clock signal 256 and write enable input 258 from AND function 260. AND function 260 receives GPIO address okay signal 262, write strobe signal 264 and GPIO address bit input 266. AND function 260 provides the AND output 258 to write enable bit 268 of data flip flop 250. Only flip-flops 250 with a 1 in their particular assigned address bit 266 will be written with its respective GPIO write date 252.

Register write circuitry 250 permits writing only to bits that must change in a register, while preserving the previous value of the remainder of bits. Register write circuitry 250 also permits software to modify critical data bits without having to recall, specify, or operate on register bits not related to a particular action.

When there is an address of a register to which the write enable bit 258, 1 to 4 GPIOs may be written to based on the address field. The $A_x$'s in [GPIO] address number input 266 represent the address bit that would base this write on to determine if there is a write to this bit or not. The write strobe 264 says that this is a write operation. The GPIO Address OK 262 is a basic address decode for the entire register. The write enable 258 to flip-flop 250 is the AND function output. When the write enable is active, input write data 252 is written to flip-flop 254 and appears on flipflop output 270.

FIG. 11 shows address field 272 that includes GPIO register address bits 274 and individual bit select field 276 addresses bits $A_0$, $A_1$, $A_2$, and $A_3$ according to the bit value, 0 or 1, of the associated bits in address field 272. The latter two bits 278 of address field 272 generally assume a zero value. In address 272, the two least significant bits assume a zero value. this is due to the bus architecture. The next four bits specified as $A_0$, $A_1$, $A_2$, and $A_3$ permit addressing four bits individually or in different combinations. The higher order or most significant bits are the particular addresses specified or allocated for this particular function. Therefore, there is a fixed set of bit patterns address the given GPIO address value to select the particular addresses. The result is a whole array of addresses from 0000 to 1111 (i.e., 16 different possible combinations) that could be addressed.

The DMA priority selector is responsible for activating the context of the channel which has the most urgent need for PCI data movement. The DMA is achitected as a main state machine (dma_fsm.v) which executes states of a selected channel. The selected channel has a number of stored conditions at any one point in time. These stored conditions are called its context. Part of a channel's context is the current state of its execution by the main state machine.

The state machine has several potential spin states where the execution of a channel must wait until certain conditions are such that the execution can continue. One obvious case is when a channel is idle and waiting for a valid PCL address to be loaded, the channel enable bit to be set, and the link bit to be set. Another case is when a receive channel is waiting for data in the receive FIFO. If a channel is waiting for receive data and another channel is ready to transfer data into the transmit FIFO then we need to service the transmit. These kind of scenarios can happen in a number of cases.

Each one of these spin states present "windows of opportunity" where another channel's execution can proceed. The priority selector looks all of these possible spin states and selects which state and channel has the highest priority at that time.

Figure 12:
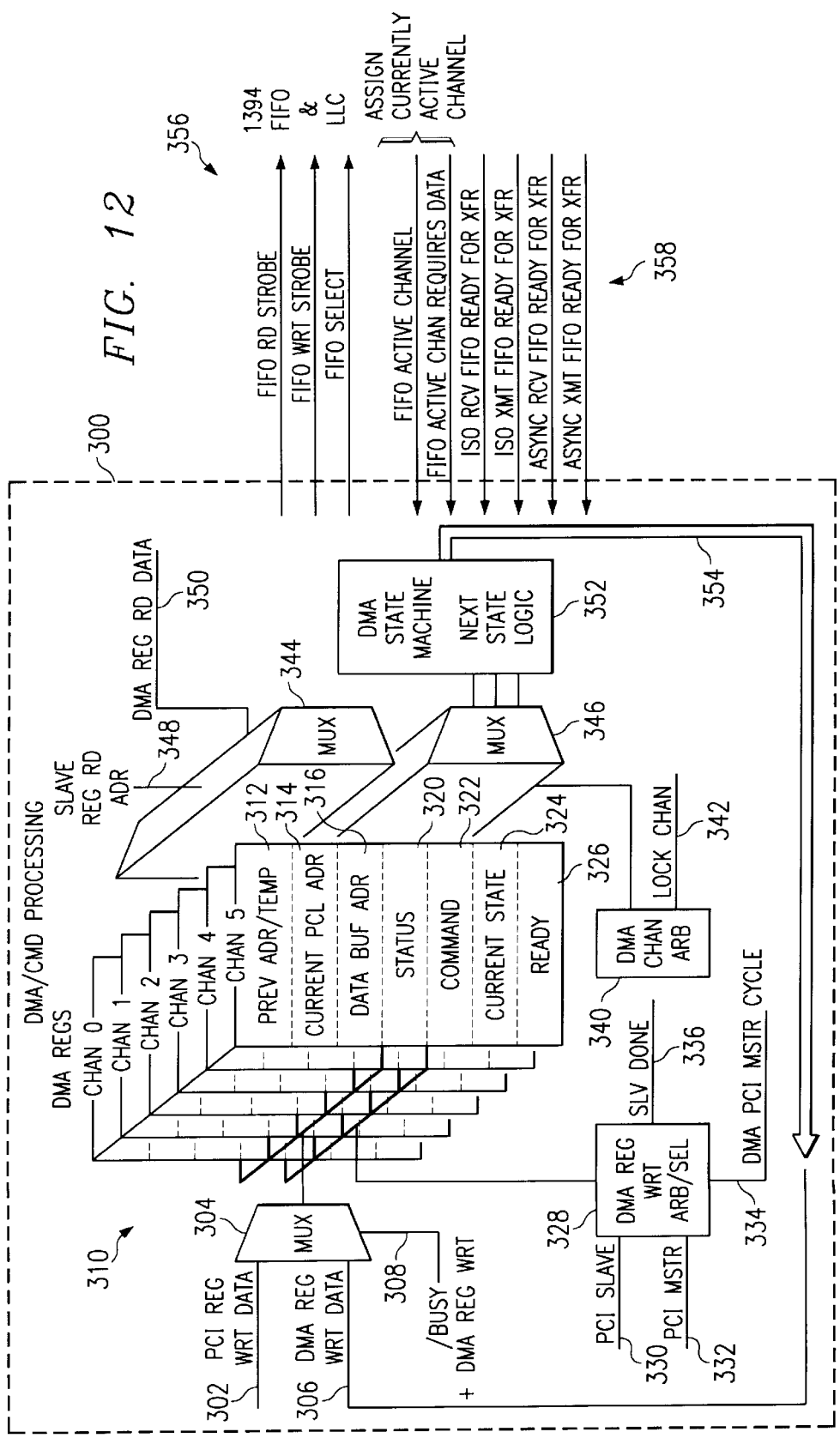
FIG. 12 provides a FIGURE of a direct memory access, multi-channel environment that is multiplexed in time to illustrate the DMA command processing operation of the present invention.

FIG. 12 shows an example of DMA command processing within environment 300. In FIG. 12, PCI register write data 302 goes to multiplexer 304. Multiplexer 304 also receives DMA register write data 306. The appropriate data source is selected 308, depending on the operation to be performed. The output from multiplexer 304 goes to DMA registers 310 which, in the illustrated example, include the six channels, channel 0 through channel 5. With each channel, DMA fields include previous address or temporary field 312, current PCI address field 314, data buffer address 316, status 320, command 322, current state 324, and ready bits 326. DMA register write arbitration select circuit 328 also provides input to DMA registers 310 that are responsive to PCI slave signal 330, PCI master signal 332, DMA PCI master cycle input 334 and slave done input 336. DMA channel arbitrator 340 receives lock channel input 342 and provides input to multiplexer 346. Slave register read address input 348 controls the operation of multiplexer 344. DMA register read data output 350 returns DMA register data to the PCI interface. Multiplexer 346 provides output to DMA state machine next state logic 352. DMA state machine next state values 354 are written back to the state register and other output registers via multiplexer 304. Output from DMA command processing environment 300 includes FIFO read, write, and select signals 356 and numerous signals.

DMA channel arbitrator 340 controls which channel will be in execution. This arbitration is based on signals from the FIFO 358 such as "FIFO active channel requires data" and "FIFO active channel," as well as which FIFO is ready to transfer data and what channels are enabled and active.

DMA Registers 310 implement a control and status register set for controlling and monitoring the status of each DMA channel. DMA registers 310 support each DMA channel with numerous functions. For example, previous packet control list start address/Temp register 312 provides a register that is updated by the DMA engine 74 as it processes a queue of packets during asynchronous transmits. It is also used during auxiliary commands as a temporary holding register for load and store data. Packet control list start address register 314 is initialized by application software to point to the start of the first (dummy) PCL in a PCL chain. DMA engine 74 uses the Next Address loaded in this PCL to link to the first actual PCL. Packet control list start address register 314 is updated by the active DMA channel as PCLs are processed. DMA buffer start address register 316 is loaded with the data buffer pointers fetched from the PCL as the active DMA channel processes the PCL. DMA status register 320 stores an ongoing count of the number of bits transferred during this PCL and contains the completion status of the transfer. After processing of the PCL is completed, the active DMA channel writes the status information of this register back into PCL at offset 0xC DMA control register 322 contains control bits to allow application software to enable or disable the operation of the DMA channel and re-fetch the next address of a PCL for linkage. DMA control register 322 stores the data buffer transfer control, transfer bit count, and commands that are fetched from the PCL. The least significant bit of DMA ready register 326 can cause the DMA channel to wait for a ready condition before it continues execution of a XMT, RCV, LOAD, STORE, STORE0 or STORE1 command. This ready condition is selected by the control word(s) of the PCL. The least significant bit of DMA ready register 326 can cause the DMA channel to conditional branch to during execution of a BRANCH command. This condition is selected by the control word(s) of the PCL. Current DMA state register 324 stores the state vector for the DMA channel. This register is updated during the active time of the DMA channel and maintains the last state vector generated when the channel goes inactive.

DMA registers 310 also may include a Receive Packet Count Register (not shown) that contains the current received packet count. DMA engine 74 loads this register with the receive packet count passed in GRF 80 token words. This count is then decremented as the data is transferred to PCI bus 24. Also, a DMA global register (not shown) may be included that contains state flags for use by the state machine to track the execution of an asynchronous transmit packet. The DMA global register may store the lower bound bits used in conjunction with the cache line size register to determine the burst size requested of the PCI master.

Figure 21A:
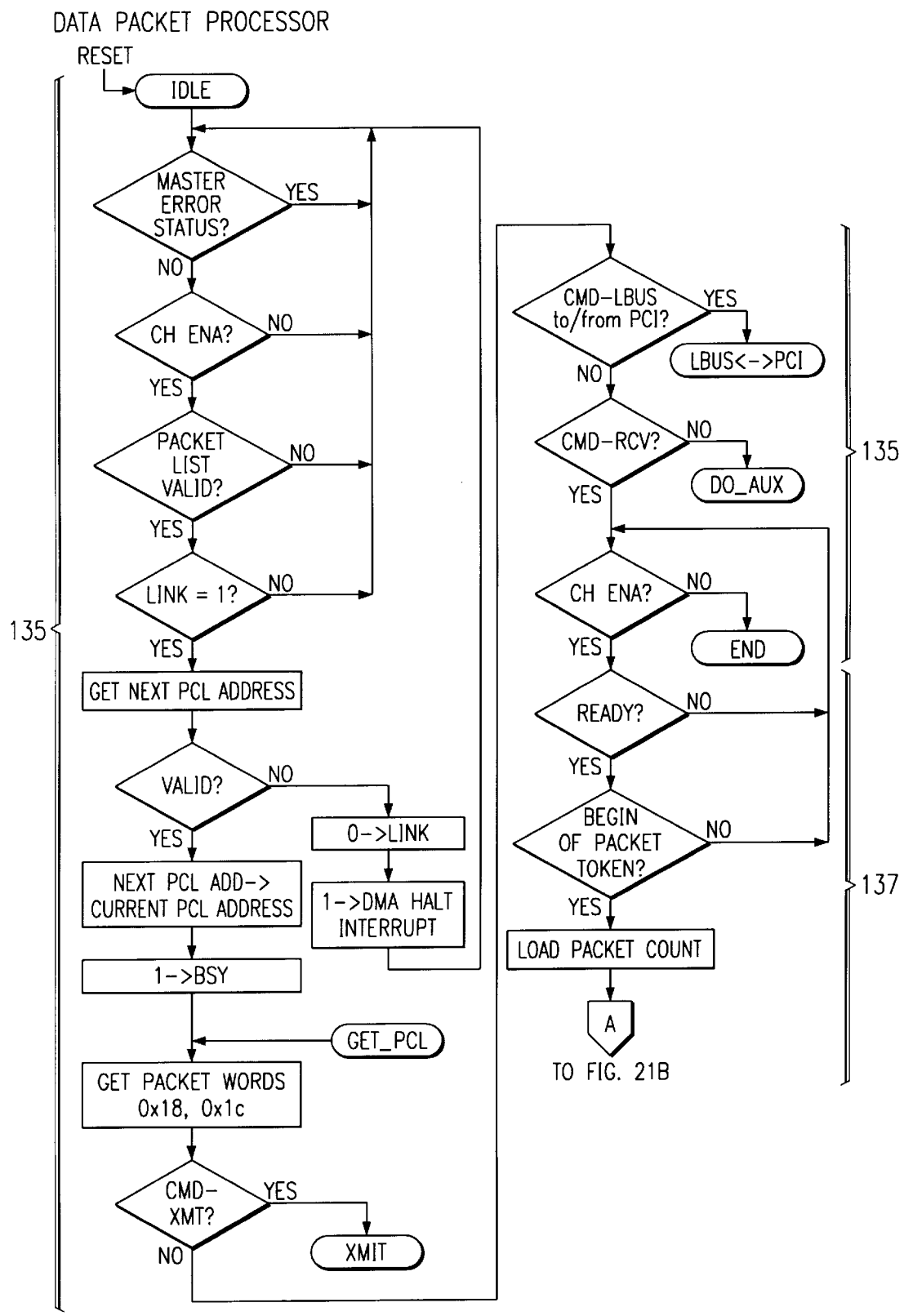
FIGS. 21A–21C show a partial flow diagram of the DMA machine showing the packet processor operation of the present invention.
Figure 21B:
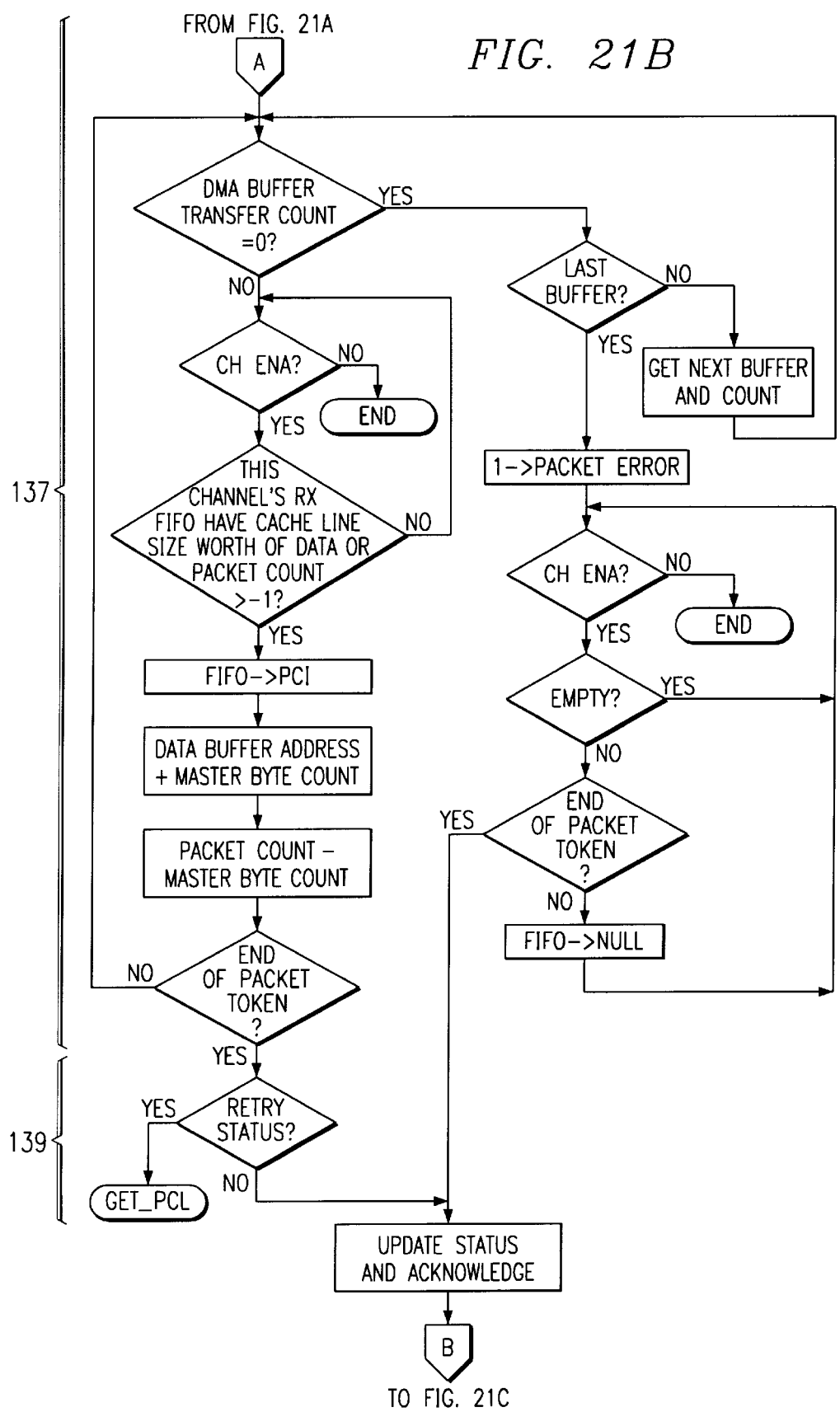
Figure 21C:
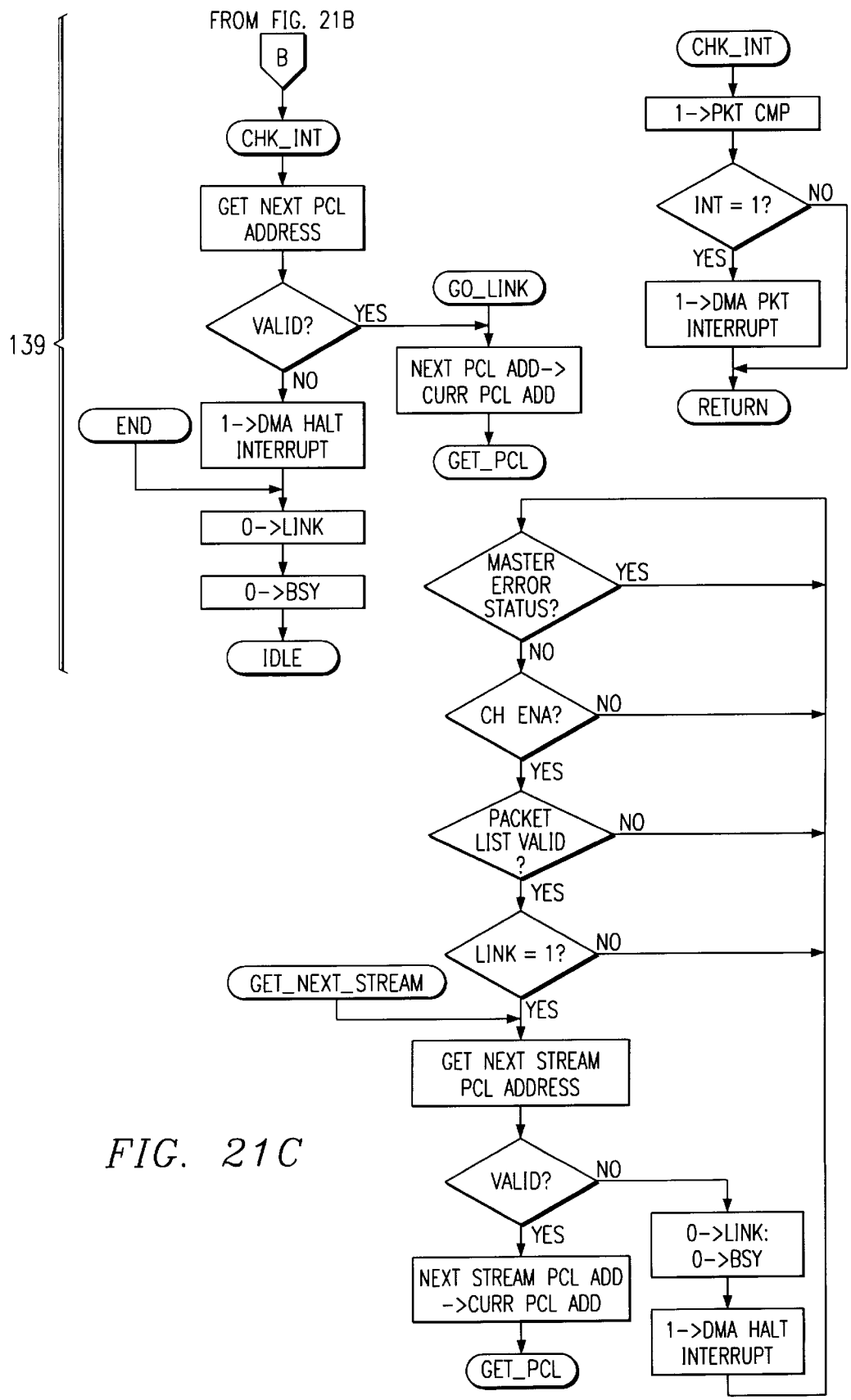

FIG. 21 shows how a DMA channel initializes after reset to a static condition at section 135. Each DMA channel 310 waits for a valid PCL pointer to be written to a packet control list start address register 314, and the channel enable and link bits are set in the DMA control register. A valid PCL pointer is determined by the state of bit 0 of the current packet control list (PCL) address register. A value of 1 indicates an invalid address, a value of 0 indicates a valid address. The DMA will then go to the address pointed to by the current PCL address register start address register, get the next PCL address and if valid will make this the current PCL address and begin execution. If this address is invalid, the link bit is cleared in the DMA control register, a DMA halted interrupt is generated for this channel with associated status in the interrupt status register and the channel goes inactive. This mechanism provides a sanity check on the PCL memory structures, as well as provides a relatively easy way to continue to channel PCL execution in the event a next address link is missed (i.e., invalid). When DMA engine 74 detects a valid next PCL address, DMA engine 74 sets BSY bit in DMA control and status registers 76 and gets the words at the appropriate PCL. A check is then made to determine whether the command is a receive, transmit, PCI to/from local bus, or auxiliary command.

FIG. 21 continues to illustrate how, at section 137, DMA engine 74 performs Receive Operation for isochronous and asynchronous data in GRF 80. DMA engine 74 proceeds by checking to see if a wait condition exists. Once the wait condition no longer exists, the processor enters a data movement phase. Here, DMA engine 74 enters a loop where the current transfer count is checked to see if it has gone to zero. If so, a check is made to see if this is the last data buffer of the PCL buffer list. If it is the last buffer and a packet boundary has not been indicated by the link layer control logic 90 writing a special control token word in GRF 80, then an error has occurred because more packet data is to be transferred than the buffer can hold. In this case, the PKT ERR bit is set in the DMA control and status registers 76 and DMA engine 74 flushes the remaining data up to the packet boundary. If the current transfer count has decremented to zero, and there is another buffer in the PCL list, then DMA engine 74 acquires the new buffer address and transfer count and proceeds with the transfer.

While moving data from GRF 80 to the PCI interface logic 70, DMA engine 74 waits for GRF 80 to have sufficient data before requesting the PCI bus master to perform a transfer. This transfer threshold is reached whenever one of two conditions is met. DMA engine 74 will request a transfer of the PCI master whenever the number of bits in the receive FIFO reaches a "high water mark". This high water mark is equal to the greater of the cache line size register or the lower bound field of the DMA global register.

The DMA gets information of a packet's data size from the link when the packet is first being written into GRF 80 by the link layer control logic 90. It uses this transfer count to determine if the data in GRF 80 is the remaining data in the packet and, if so and the size is less than the high water mark, it will request a transfer of PCI Master logic 64 where the transfer count is equal to this remainder. While DMA engine 74 is transferring data, the data buffer start address register and the data buffer transfer length bits in the DMA control and status registers 76 are updated to reflect the current state of the transfer.

As section 139 of FIG. 21 indicates, when link layer control logic 90 encounters the end of a packet, it writes a special control token word into GRF 80 to mark the end of a packet. Embedded in this control word are status bits that indicate the completion state of the packet on the bus. DMA engine 74 uses this end of packet marker to terminate the transfer of data from GRF 80 to PCI bus 24. If the end of packet marker indicates a IEEE 1394 busy acknowledge signal is present, DMA engine 74 re-acquires the PCL's first buffer address and transfer count and starts the packet's transfer all over. If there was no busy acknowledge status indicated from the end of packet marker then DMA control and status registers 76 are loaded with the acknowledge status passed from link layer control logic 90 in the end of packet marker, a packet complete bit is set. The packet completion status is then written to memory in the PCL status word and an interrupt is signaled and latched in the corresponding bit in the Interrupt Status register. If the command was a receive-and-update command, then the remaining transfer count and next buffer address are written to appropriate PCL offsets.

FIG. 13 shows table 360 to indicate the operation of DMA channel arbitration circuit 340. Table 360 shows that, if a channel is currently active on the IEEE Standard 1394 bus, that channel has the highest priority to be scheduled for execution in the DMA channel. Otherwise, channel priority is in order of channel number, with 0 being the highest priority. A "don't care" value is assigned as the value "X" at 362. This means that no matter what other values may be, the currently active channel is the highest priority. That is the channels that get scheduled at the earliest possible convenience.

The operation of DMA command processing may be seen through the following example. Suppose the DMA is currently operating on channel 3. All registers for channel 3, therefore, are selected via multiplexer 346 within the DMA. The DMA selects the particular slice of registers to appear on the DMA state machine current state and next state logic.

Figures 14, 15:
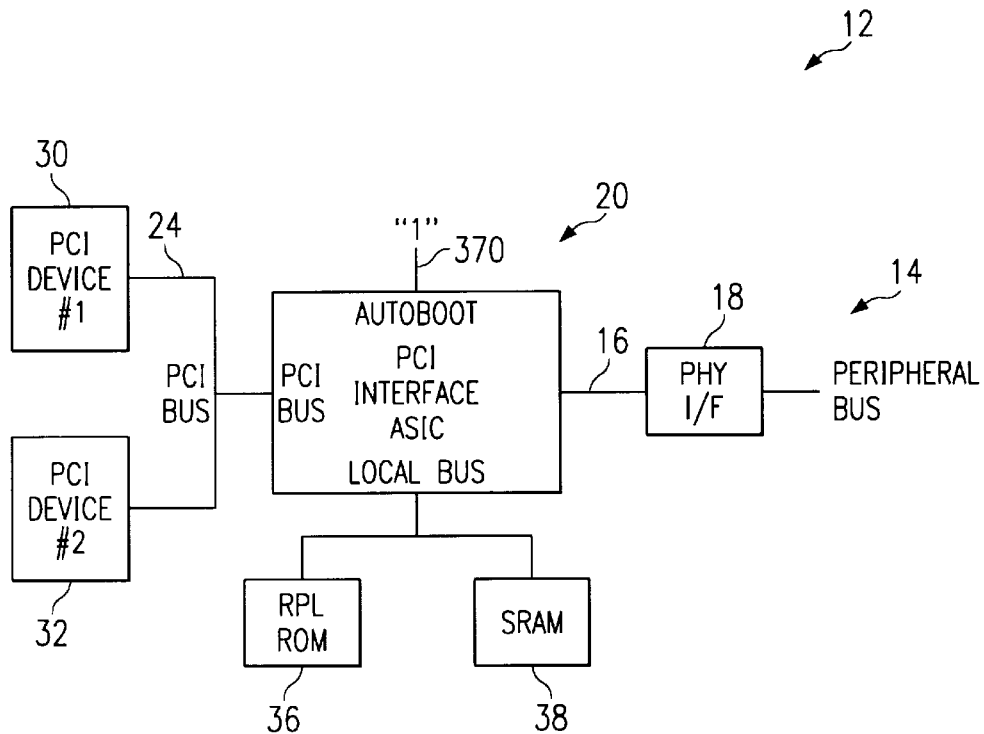
FIG. 14 shows a portion of the interface device architecture for the present invention applicable to the autoboot function.
FIG. 15 provides a table of PCI master bus commands corresponding to bits 31 and 30 of the internal PCI address bus when the autoboot pin of FIG. 14 is set active.

FIG. 14 provides a simplified diagram of the personal computer environment 12 of the present embodiment that includes the auto boot function 370. Pin 370 of PCI-interface ASIC 20 provides a direct input to auto boot PCI-interface ASIC 20. As a result, PCI-interface ASIC 20 may operate as a host device for PCI device #1, at reference numeral 30, PCI device #2, at reference numeral 32, through PCI bus 24. Commands for autonomous operation of PCI-interface ASIC 20 may use RPL ROM 36 and SRAM 38. In addition, through interface bus 16, PCI-interface ASIC 20 may communicate with PHY interface 18.

When the autoboot pin 370 is active (i.e., tied high), the autoboot mode of the present invention is selected. The autoboot mode enables a number of features which allow PCI-interface ASIC 20 to function autonomously. Autonomous operation includes the feature of, after power reset, fetching the address of the first packet control list using DMA channel 0. After power reset, also, the autoboot mode makes possible enabling the DMA master access to external RPL ROM. Moreover, after power reset, the autoboot mode enables the feature of DMA master access to internal link registers.

Once enabled as master on the PCI bus 24, PCI-interface ASIC 20 can issue PCI configuration, input/output, and memory read and write commands on PCI bus 24 by specifying the appropriate address range in the controlling packet control list. In the autoboot mode of operation, the external PCI address space is limited to 30 bits. The two most significant address bits are always at a 0 value. Internally, these two bits are used to select the PCI command.

The state of autoboot pin 370 can be read from a special bit in a miscellaneous control register for diagnostic purposes. With the autoboot mode selected and an external ROM, the present invention may operate PCI-interface ASIC 20 as the local processor to set up all internal PCI-interface ASIC 20 registers, to initialize other devices on PCI bus 24 and to build and queue other PCLs. The various DMA channels may be enabled to execute these PCLs to transfer data across the IEEE 1394 bus.

By adding external local bus RAM to PCI interface device 20, PCI slave memory is provided for devices on PCI bus 24 to obtain control information and have local memory for data transfer. PCL programs can then transfer device control/ data via IEEE 1394 to another system. Accordingly, an environment that employs the autoboot mode of the present invention could be used for peripheral devices, where there may not be a suitable processor available to manage the PCI interface environment.

Circuitry of FIG. 14 provides another mode of operation for the chip via an external pin. The effect is to enable and pre-specify a portion of the memory map to allow enough resources to be accessible to the DMA engine 74 on power-up to execute and have access to all required functions to perform useful work. Also, the effect is to modify the behavior of the DMA engine 74 so that, when the DMA machine is in a particular mode, the machine requires new instructions from a dedicated ROM instead of becoming inactive.

DMA engine 74 comes up active and acquires a certain address for obtaining instructions. This permits PCI-interface ASIC 20 to operate in a stand-alone mode. This also allows the generation of PCI memory commands, and input/output commands all from PCI-interface ASIC 20.

Using autoboot pin 370, the present invention permits reconfiguring the power-up memory map by enabling access and initializing ROM and RAM base address registers. This allows the DMA machine read and write access after power-up. Moreover, the present invention modifies the behavior of DMA engine 74 when the autoboot mode is selected. This permits acquiring a new instruction from a dedicated ROM address upon power-up. The initial access address is exactly 0 in the present implementation. The invention further provides a method go generate bus commands and protocol not required in a normal environment.

DMA engine 74 can acquire and execute instructions from RPL ROM 36 when the autoboot option is selected. This permits DMA engine 74 to generate required commands to act as a master agent on an external PCI bus to configure, initialize and manage other PCI devices on this external bus.

Table 380 of FIG. 15 depicts the mapping of internal PCI address bus [31:30] bits to commands on the PCI bus, when the autoboot input 370 is active. For example, in the event that bit 31 assumes a value of 0 and bit 30 assumes any value, PCI memory command is activated. Thereafter, with address bit 31 assuming a 1 value and address bit 30 assuming a 0 value, PCI I/O command occurs. With an address bit 31 value of 1 and address bit 30 value of 1, the PCI configuration command goes to PCI interface ASIC 20.

Figure 16:
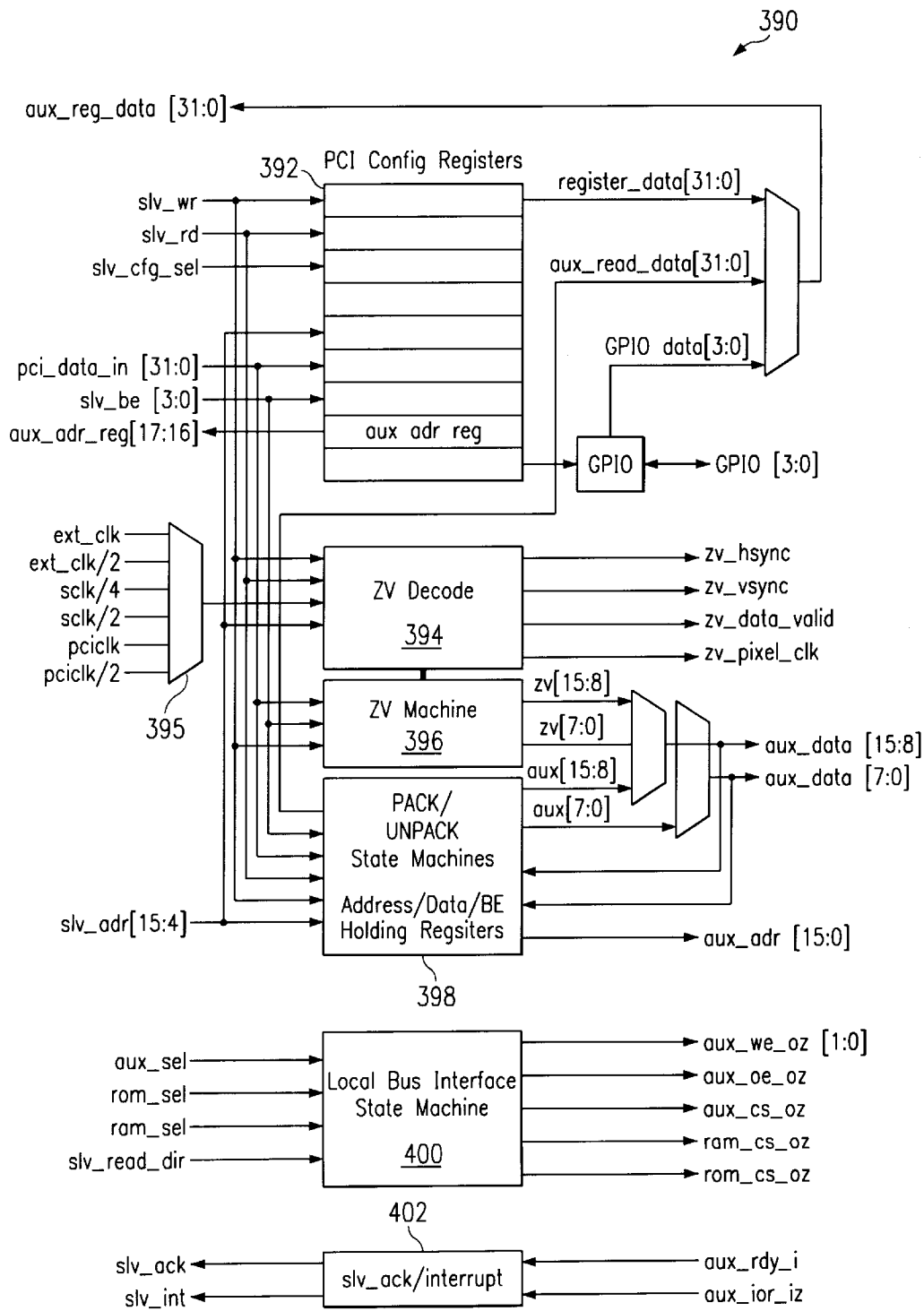
FIG. 16 depicts the local bus interface of the present invention in block diagram form.

FIG. 16 shows a diagram of a local bus interface block 390 according to one aspect of the present invention. Local bus interface block 390 includes local bus configuration registers 392, zoom video (ZV) decode interface block 394 that communicates with ZV machine 396. Pack/unpack state machines 398 include address/data/bit enable holding registers 398. Local bus interface block 390 also includes local bus interface state machine 400 and slave acknowledge interrupt block 402.

ZV port of FIG. 2 is an output-only port designed to transfer data from the IEEE 1394 Standard bus to an external device on PCI-interface ASIC 20. When correctly programmed, the ZV interface logic provides a method for receiving IEEE 1394 digital camera packets and transfer the payload to an external ZV-compliant device with the appropriate control signals.

ZV decode circuit 394 is accessed via a subset of the third PCI memory based address register. When ZV decode circuit 394 is enabled, auxiliary addresses between 0xF000 and 0xFFFF map to the ZV port. The ZV port is enabled when one of six available clock sources 395 is selected as the ZV pixel clock. If none of the six clocks are selected, the ZV port is disabled and the auxiliary interface claims the entire address space. When the ZV port is disabled, all ZV-related outputs are tri-stated with the exception of the data bus, which will still be driven during auxiliary, RAM and ROM accesses.

With the ZV port, a vertical synch signal is generated on detecting the IEEE 1394 isochronous packet header synch field equal to 0X1. In the present embodiment, data bit 24 contains the significant synch field data. Upon detection of this vertical synch bit, a vertical synch output is generated. For the remainder of the frame, a horizontal synch output is generated whenever a special address is accessed when transferring video data to the zoom port. By properly programming the packet control list, all IEEE 1394 digital camera packets may be transferred via the ZV port.

Figure 17:
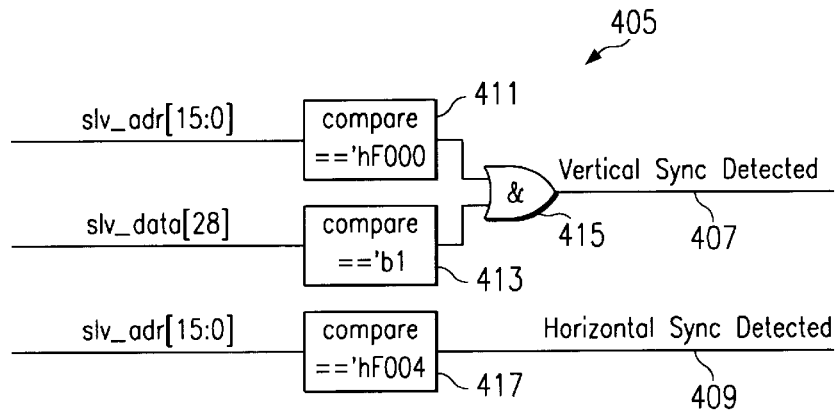
FIG. 17 diagrammatically shows the logic of the interface device of the present invention in detecting the presence of horizontal and vertical synch signals.

FIG. 17 shows one embodiment of the synch detect circuitry 405 of the present invention for generating vertical synch detected signal 407 and horizontal synch detected signal 409. When PCI slave address bits [15:0] assume a value of 0XF000 and slave data bit 28 assumes the value of binary 1, the compare circuitry 411 and 413 send signals to AND gate 415. This produces a vertical synch detected signal on line 407. Similarly, when slave address bits [15:0] provide the 0XF004 to compare circuitry 417, a horizontal synch detected signal appears on line 409.

Figure 18:
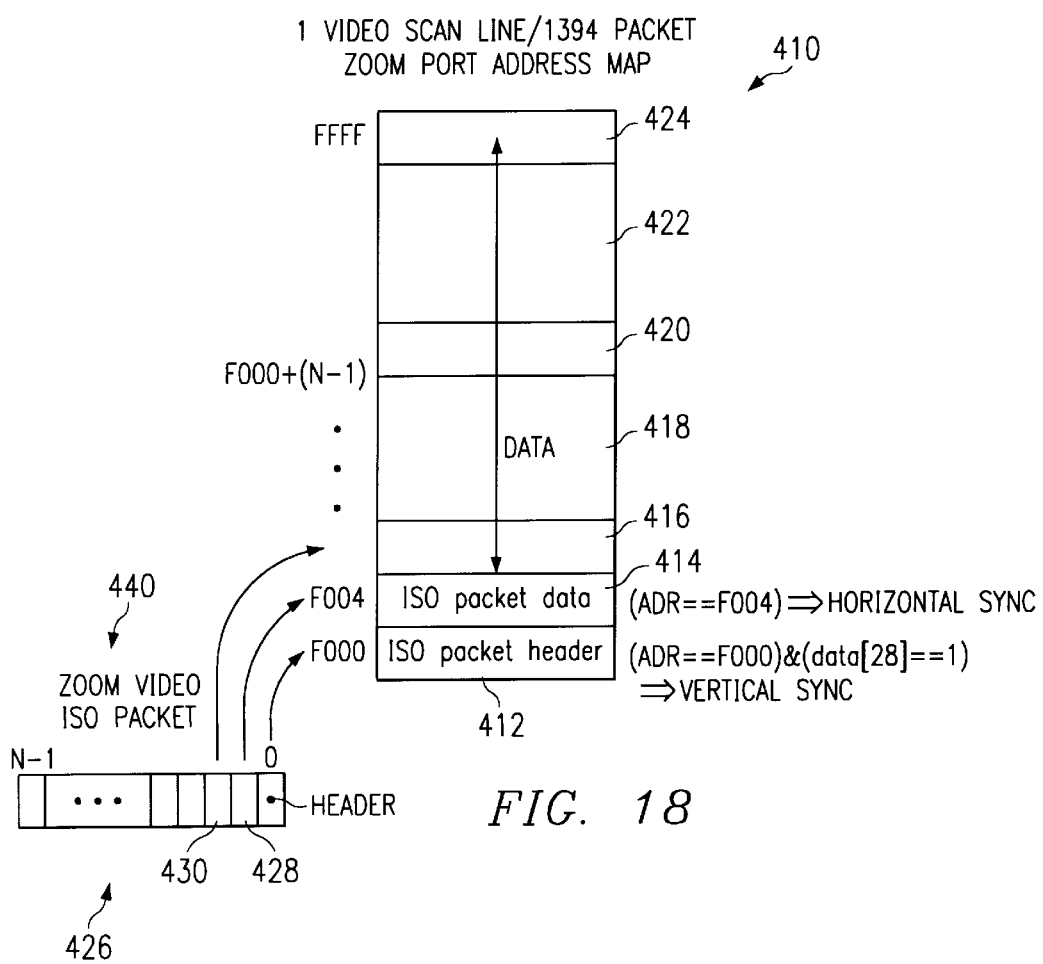
FIG. 18 illustrates another aspect of the present invention including the operation of directing a single data packet to a single scan line.

FIG. 18 shows one video scan line for packet zoom port address map 410 according to the present invention. Zoom port address map 410 includes Isochronous packet header 412 beginning at address 0XF000 and Isochronous packet data space starting at address 0XF004 and ending at 0XFFFF as reference numerals 414 through 424 detail. Each isochronous packet is transferred to the zoom port address space, with the header quadlet being transferred to address 0XF000, the first data payload quadlet 428 being transferred to address 0XF004 and the remaining quadlets in the packet being transferred to sequential addresses until the end of the packet payload data is transferred to address (0XF000+(N−1)) for packets N quadlets long.

FIG. 18 shows that the present invention permits autonomously displaying the video image displayed in a hardware managed window without any software support. The present invention permits raw data to be shipped across the IEEE 1394 bus and to flow into the zoom port in a compatible format that goes into the video controller chips as input data. This permits autonomously displaying data, while maintaining horizontal and vertical frame synch.

In operation, zoom video port is mapped into a certain address space. The headers contain frame synch information or signals. By building up the correct control structures to make the header packet data transfer to a particular address based on the address, the logic will look for certain fields. In the case of the Sony camera complying with IEEE P1394 Digital Camera Specification, a bit in the isochronous header synch field indicates start of a video frame. By decoding this particular isochronous header synch field bit, a vertical synch signal is generated. One can use that information to synchronize the receipt of zoom port data to the zoom port.

There are two cases of this implementation, one for horizontal synch and the other for vertical synch. For the vertical synch, the decode requires a particular address, and a particular isochronous header synch bit. Horizontal synch is generated by decoding another particular address.

The video zoom aspect of the present invention provides the ability to autonomously extract control information, such as horizontal or vertical synch signals, from packetized data containing embedded control information such as encoded video. Compare isochronous logic 411 and 413 detect transfers to a specific destination address of specific data values.

The present invention also provides software or hardware control structures that specify appropriate destination addresses for different segments of the packet data. The DMA architecture allows the data to be gathered or scattered so that a particular packet can be broken up into different destination addresses of different lengths. Accordingly, the present invention can write header fields to a particular address and data fields to another address. Using this feature the present invention controls what portions of the PCI interface device see what addresses.

The present invention further provides programmable counters that may be used to base control signal generation on multiple accesses to particular address locations and/or data patterns. This occurs through the use of counters to give the option of multiple packets per horizontal line or between horizontal synchs. Accordingly, immediately after vertical synch there may be generated a horizontal synch signal. This permits counting the number of times that a system goes through a particular address. The system only generates another horizontal synch signal for example after four iterations through the address. This permits packing four packets through the horizontal line, according to the particular camera, resolution, etc.

Figure 19:
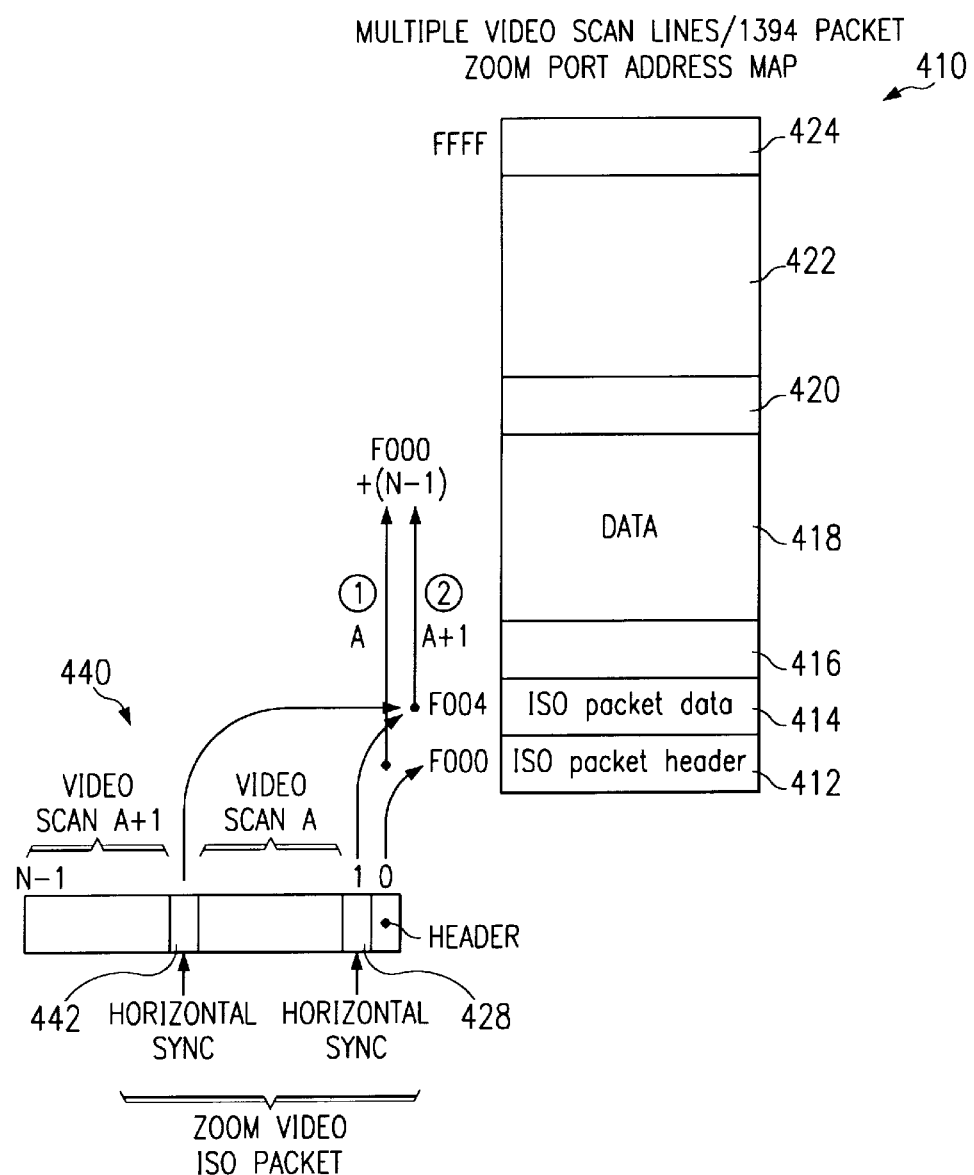
FIG. 19 shows the operation of the present embodiment for mapping a single data packet into multiple video scan lines.

FIG. 19 shows the process of mapping a single video packet to multiple video scan lines using the zoom port address map 410. Zoom port address map 410 includes Isochronous packet header 412 that adjoins Isochronous packet data 414. Memory spaces 416 through 424 are as described in FIG. 17. Zoom video Isochronous packet 440 includes header quadlet 0 which may contain a start of frame bit in the isochronous header synch field. Quadlet 1 is the first video data payload quadlet which indicates the beginning of video scan A. A horizonal synch signal is generated by the write of this quadlet to address 0XF004. Similarly, the write of data quadlet 442 to address 0XF004 indicates the beginning of video scan A+1 by generating a horizonal synch. Data writes starting at 0XF000, going to [0XF000+(N−1)] will actually be the data that is output through the zoom video port, i.e., the zoom data. The header is stripped off and not part of the data field.

Accordingly, this case generates a vertical synch and a horizontal synch for the first packet in a video frame. The following packets signify following scan lines that fill out the rest of the video frame headers, but the headers do not contain the synch fields. The data flows the same way for all packets, each starting at the point 0XF000, where the header is and, if there is no synch bit in the header, then the vertical synch will not be set. When it writes to F004, the horizontal synch will be generated. This generates the start of a scan line, so that the remaining data will flow out as part of the scan line.

Even further there is the situation of multiple scan lines per packet. To handle this, the packet control lists are used.

DMA engine 74 of the present invention is controlled by data structures called packet control lists or PCLs. The PCL contains command information which the DMA fetches from memory as needed. These commands tell the DMA the sources and destinations for the data and how many bytes it is to transfer. Some commands move chunks of data between the IEEE 1394 transmit FIFOs and PCI bus 24, or between the general receive FIFO 80 and PCI bus 24. Another command moves data between PCI bus 24 and auxiliary port local bus 26. Other commands are for secondary functions and are called auxiliary commands. These auxiliary commands allow the DMA to peek and poke quadlets of specified data to any PCI address and permit some conditional branching using the PCLs. The intended use is to permit the DMA to perform special data movement controls and to function as a stand-alone processor which can build PCLs in an autoboot sequence. The entire scope of this functionality is not regimented, and other uses of the DMA will evolve.

Application software of the present invention programs the operation of a DMA channel using the PCL data structure, which resides in host memory. The application software is responsible for constructing PCL and allocating memory for their storage. A PCL may be organized as a contiguous set of memory locations that contain the commands, control parameters, and data buffer pointers required by a DMA channel to transfer one IEEE 1394 data packet, or to move data between PCI bus 24 and auxiliary port local bus 26, or to execute one or more auxiliary commands. The total number of memory locations required by a PCL is generally limited to 32 quadlets in the current implementation.

As a minimal requirement, the PCL starting address is aligned to a quadlet boundary. For optimum DMA performance, the PCL start address is recommended to be a line on a cache line boundary. The data buffer pointers may be aligned to an arbitrary byte boundary. For optimal DMA performance, the present invention aligns data buffer pointers on a cache line boundary. If this is not possible, the next optimal data buffer pointer alignment should be on a quadlet boundary. The sum of the sizes of the data buffers pointed to by the PCL are approximately limited to one kilobit for an IEEE 1394 bit rate of 100 mbps or 2 kilobits for an IEEE 1394 bit rate of 200 mbps.

In the present embodiment, the active DMA channel fetches the commands and control parameters from the PCL and uses them to configure the channel itself to perform the command in transfer.

Application software programs allow the DMA channel to transfer multiple IEEE 1394 data packets by chaining together multiple packet control lists into a PCL list queue. The present invention constructs the queue by setting the next address field of each PCL to point to the starting address in memory of the next PCL. The last PCL in the queue can be program to either halt DMA processing, point back to the start of the queue, or point to a new queue. PCLs containing auxiliary commands may be embedded anywhere in a PCL queue, but not both. A PCL queue may mix receive and transmit and auxiliary commands together; however, an asynchronous transmit command must be followed by another asynchronous transmit command due to the potential pipelined nature transmits and the possibility of a packet retry. On the other hand, setting the "wait for status" bit in the asynchronous transmit command precludes this requirement.

Figure 20:
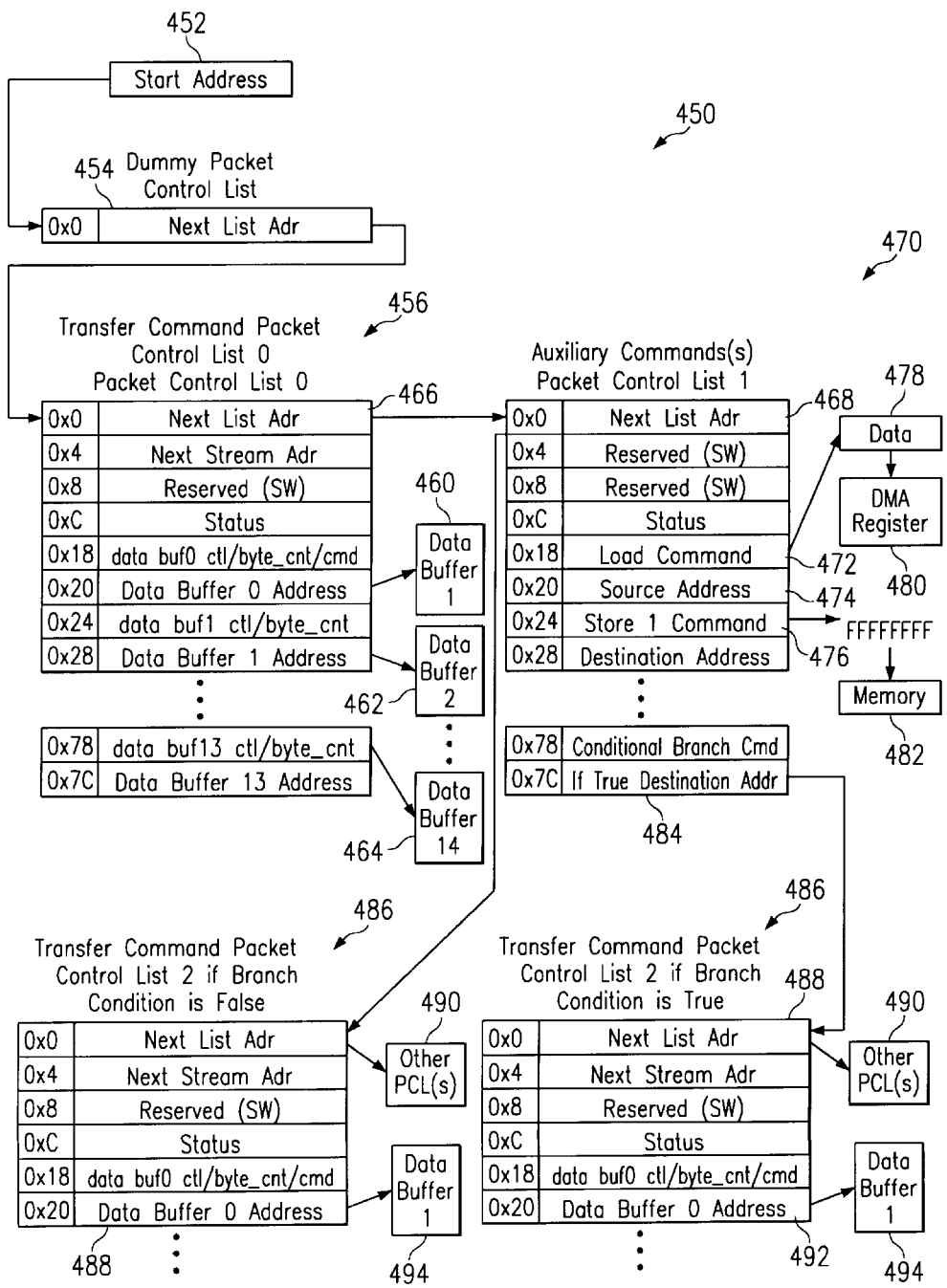
FIG. 20 illustrates a memory maps of packet control list data structures and data buffers used by the DMA packet processor of the present invention.

FIG. 20 illustrates an example of a linked list of packet control lists, according to the present embodiment of the invention. In FIG. 20, PCI queue 450 begins at start address 452. From start address 452 process flow goes to dummy packet control list 454. Dummy packet control list 454 sends process flow to transfer command packet control list 456. In transfer command packet control list 0, data buffer count command and data buffer address information goes to data buffers 460, 462, on to, for example, data buffer 464 indicating, in this example, fourteen data buffers in use.

Transfer command packet control list 0, at reference number 456, includes next list address 466 that goes to auxiliary command packet control list 1, at reference numeral 470. Auxiliary command packet control list 1, at reference numeral 470, includes load command 472, source address at location 474 and store command and location 476. Load command 472 goes to data register 478 which supplies DMA register 480. Store 1 command 476 provides input to memory location 482. Auxiliary command packet control list 1, at reference numeral 470, also includes if true destination address 484 that conditionally sends PCI process control to transfer command packet control list 2, at reference numeral 486. Transfer command packet control list 2, at reference numeral 486, includes next list address 488 that goes to other PCLs, as indicated by reference numeral 490, while data count and data buffer addresses 492 and the like go to data buffer 494 and the like. In the event that if true destination address 484 controls process flow of the PCL queue, next list address 468 goes to transfer command packet control list 2, at reference numeral 486. This information then goes from next list address 488 to other PCLs, as indicated by reference numeral 490, and data buffer 0 address and count command information go to data buffer 1 and the like.

Typically, in operation host CPU 44 allocates memory for building a packet control list and a dummy next PCL address, because there is no previous PCL in existence. The dummy next PCL address provides a memory location that is a pointer to the start of the first full PCL, i.e. PCL 0. The host processor then builds up the desired list of PCLs for doing the operation with the data transfer or some type of auxiliary command, such as the auxiliary commands that do actual processor-like instructions.

The spaces in the next PCL address, include an error address, a reserve location, and status. The next pair is the control state, transfer count. The next one after that is the data buffer address. These two long words constitute one instruction or data transfer to one data buffer. The transfer example is a buffer address that points to a data buffer location in the memory to which the data is to be transferred to or from. If data is to be continually transferred, the present embodiment makes possible forming a large control loop for continuous data transfer.

Figure 22A:
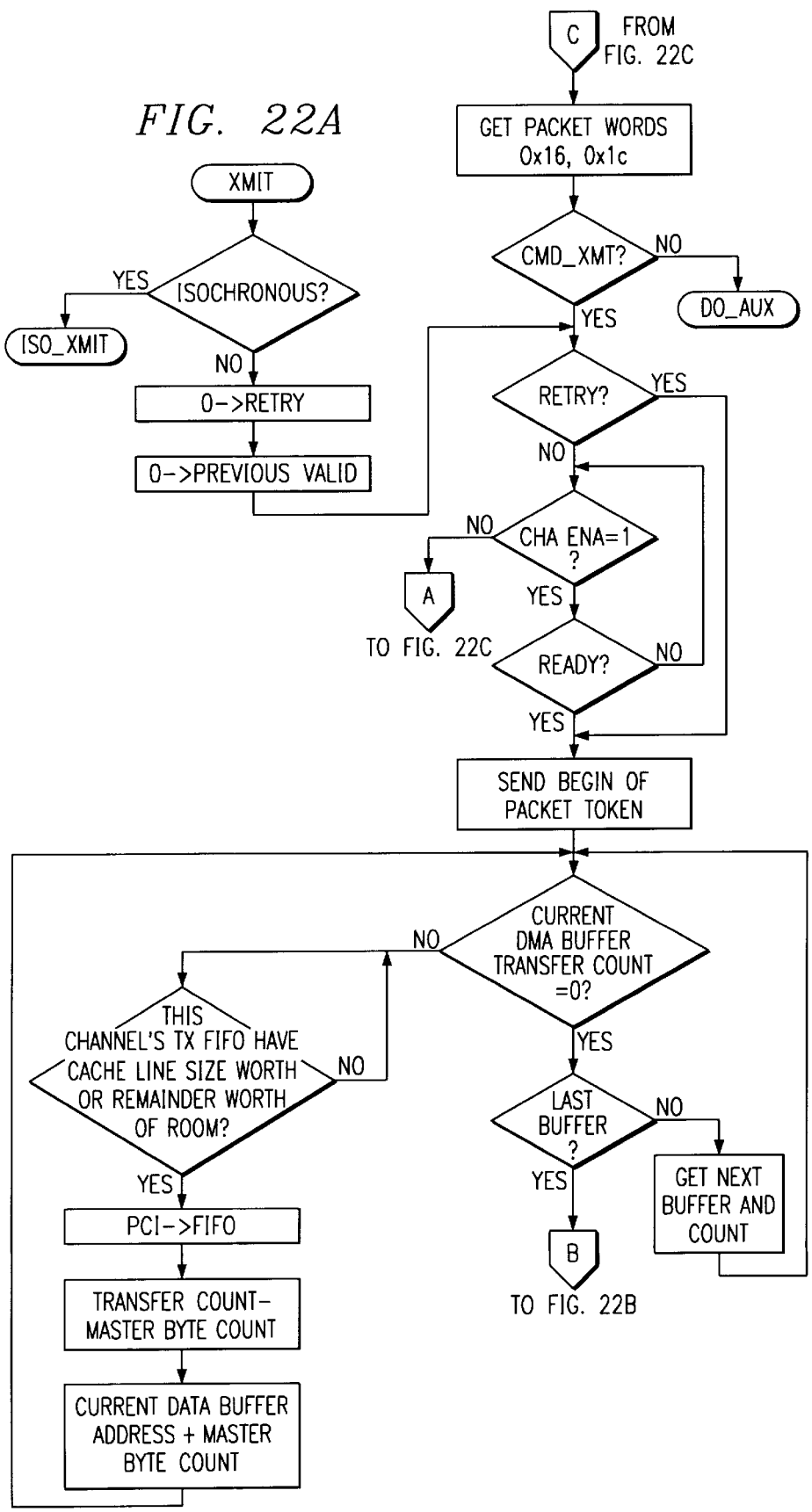
FIGS. 22A–22C provide a partial flow diagram of the DMA machine showing the asynchronous transmit operation of the present invention.
Figure 22B:
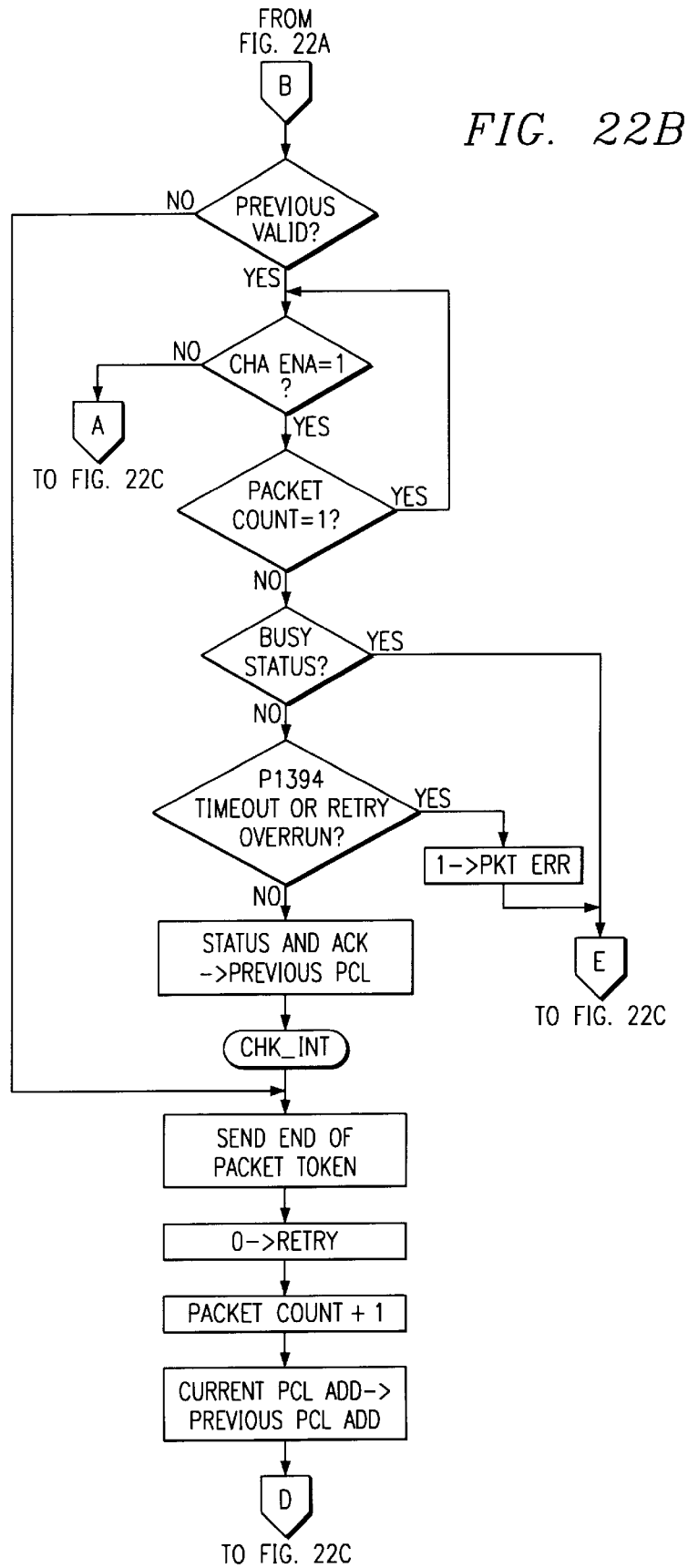
Figure 22C:
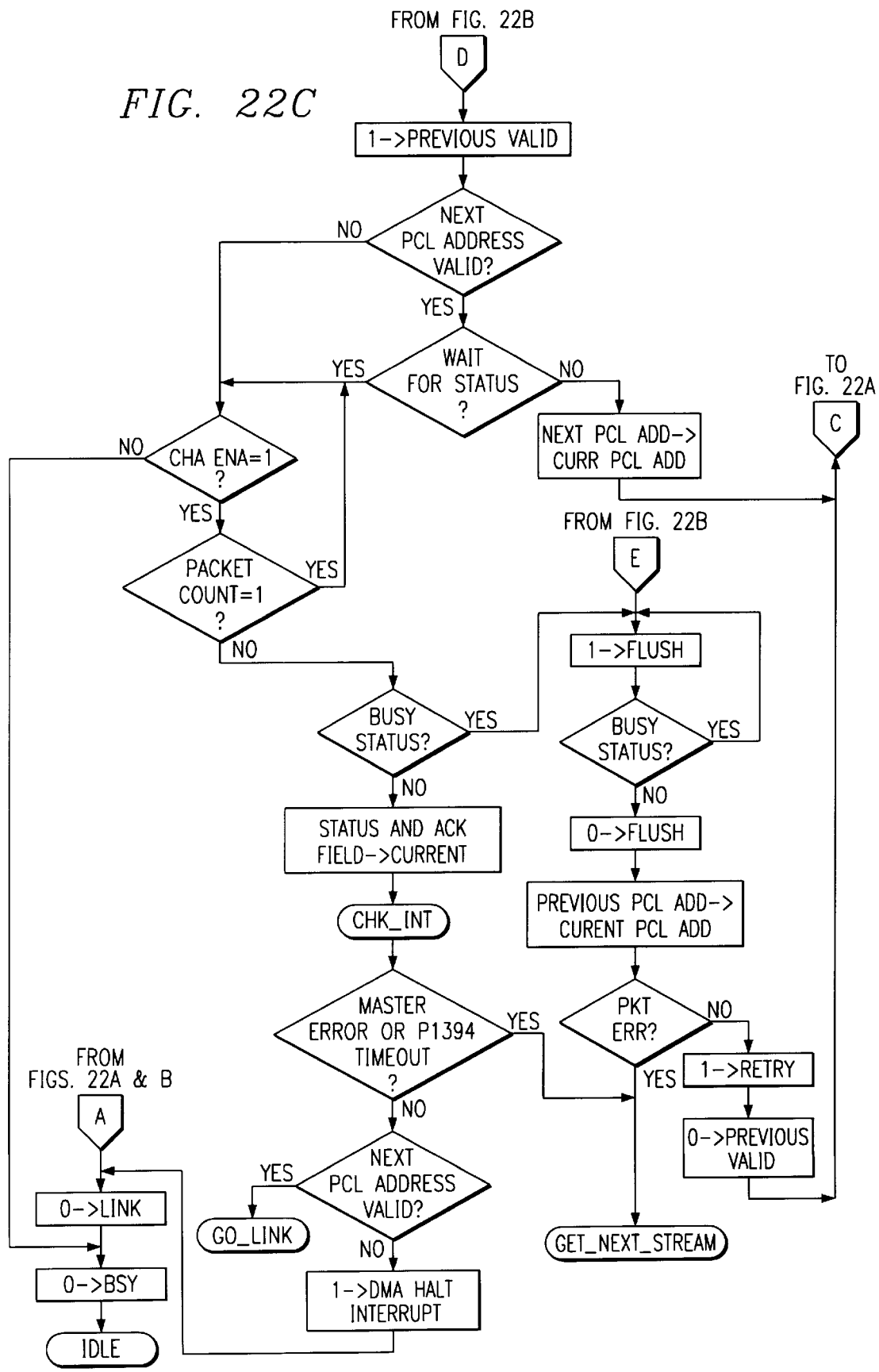
Figure 23:
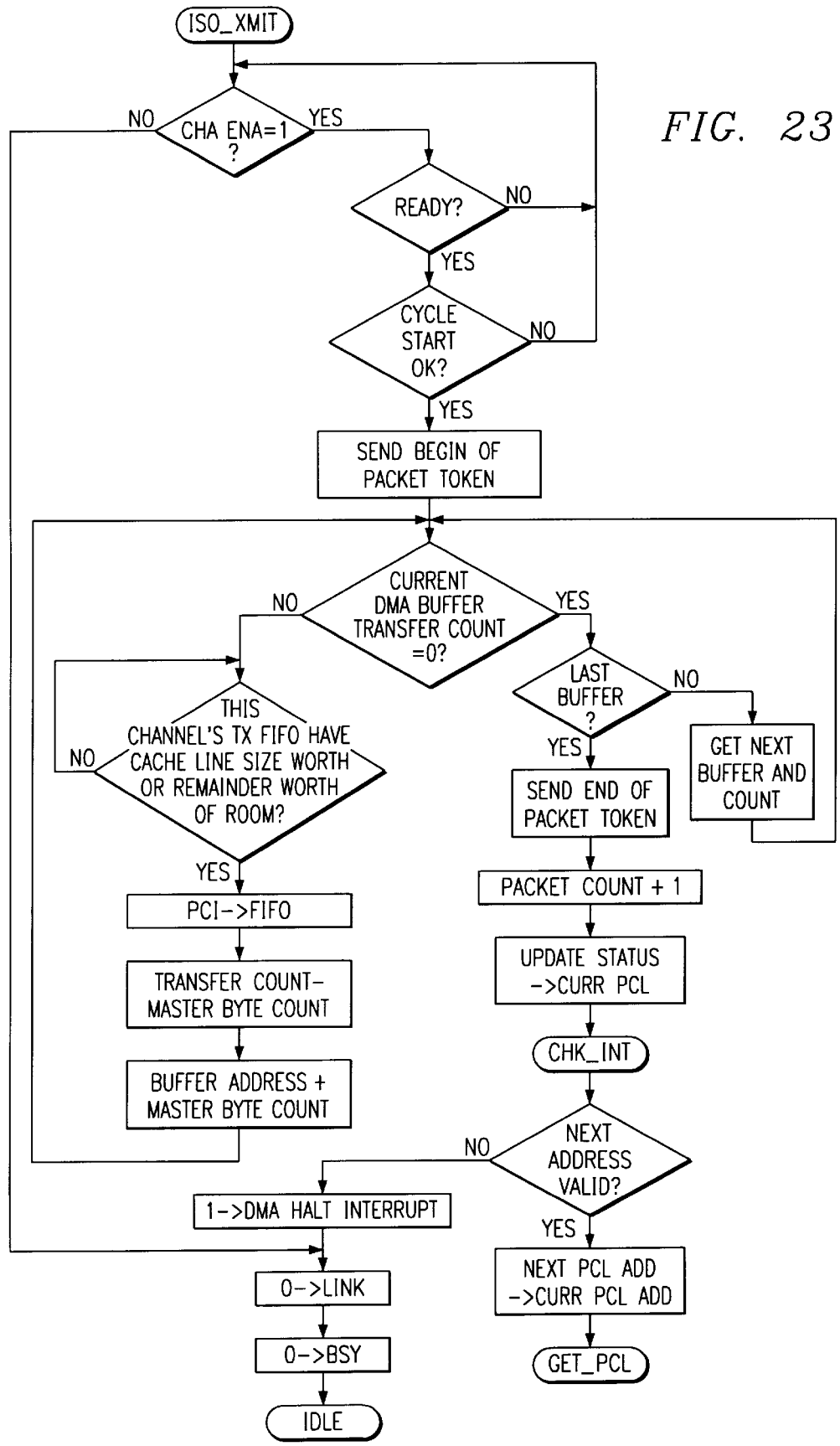
FIG. 23 is a partial flow diagram of the DMA machine showing an ischronous transmit operation of the present invention.

FIGS. 21 through 25 and the following discussion describe the operation of the present invention for a receive, transmit, PCI to/from local bus, or auxiliary operation. In a receive operation, as FIG. 21 shows, for isochronous and asynchronous data in GRF 80, process flow begins by checking to see whether a wait condition exists. For an isochronous transmission, as FIG. 23 shows, if the channel enable equals 1, the transmit function is ready, and the cycle start bit is ok, then is no wait condition. A wait condition is determined by the wait selector bits of the data buffer control word zero. Once a wait condition no longer exists, the processor enters a data movement phase. Here a loop is entered where the current transfer count is checked to see if it has gone to zero. If so, a check is made to see if this is the last data buffer of the PCL buffer list. If the data buffer is the last data buffer and a packet boundary has not been indicated by the link layer controller writing a special control token word into GRF FIFO, then an error has occurred because more packet data is to be transferred than the buffer can hold. In this case, the packet error bit is set in the DMA status register, and the DMA will flush the remaining data up to the packet boundary If the current transfer count has decremented to zero and there is another buffer in the PCL list, then the DMA acquires the new buffer address and transfer count and proceeds with the transfer.

While moving data from the receive FIFO in the PCI interface, the DMA waits for the FIFO to have sufficient data before requesting the PCI bus master to perform a transfer. This transfer threshold is reached whenever one of two conditions is met. The DMA will request transfer of the PCI master whenever the number of bytes in the receive FIFO reaches a "high watermark." This high watermark is equal to the greater of the cache line size register or the lower bound field of the DMA global register. The DMA gets information of a packet's data size from the link when the packet is first being written into the FIFO by the length layer controller. It uses this transfer count to determine if the data in the FIFO is the remaining data in the packet and, if so, and the size is less than the high watermark, it requests a transfer of the PCI master where the transfer count is equal to this remainder. While the DMA is transferring data, the data buffer start address register in the data buffered transfer length bits in the DMA control register are updated to reflect the current state of the transfer.

When the link layer controller encounters the end of a packet, it writes a special control token word into the FIFO to mark the end of a packet. Embedded in this control word are status bits that indicate the completion state of the packet on the bus. The DMA uses this end of packet marker to terminate the transfer of data from the FIFO to the PCI bus. If the end of packet marker indicates an IEEE 1394 busy acknowledge, the DMA reacquires the PCL's first buffer address and transfer count, and starts the packet's transfer over again. If there is no busy status indicated from the end of packet marker, the DMA status register is loaded with the acknowledge status passed from the link layer controller in the end of packet marker, the packet complete is set. It is then written to memory in the PCL status word along with the number of bits transferred for this PCL. If the INT bit is set for the data buffer control/byte count command in the PCL, then an interrupt is signaled and latched in the corresponding DMA PCL bit in the interrupt status register. If the command was a receive and update command, then the remaining transfer count and next buffer address are written to the PCL. The DMA then determines whether another PCL has been linked to the current PCL by fetching the next list address field of the current PCL. If there is a linked PCL, the DMA makes the linked PCL the current PCL and continues execution. If another PCL has not been linked to the current PCL, then the link and busy bits are cleared in the DMA control register, a DMA halted interrupt is generated for this channel with associated status in the interrupt status register, and the channel becomes idle.

For the DMA asynchronous transmit operation, as FIG. 22 shows, an asynchronous transmit is determined after a valid PCL pointer has been written to the packet control list start address register and the channel enable and link bits have been set. The overall goal of the asynchronous packet processor is to remain one packet ahead of the current packet being transferred from the FIFO to the IEEE 1394 bus by the link layer controller. From the DMA's point-of-view, this packet on the bus was a previous packet. Any status reported by the link layer controller is assumed to be for this previous packet; however, setting "wait for status" bit in the "data buffer/byte count/command" in the PCL will prevent this pipelining operation. The DMA keeps the address of the previous packet control list start address in the previous packet control list start address/temporary register. The flag called "previous PCL valid" is kept by the DMA in the DMA global register to keep track of whether it has a stored valid address. A transmit operation for an asynchronous channel proceeds by checking to see if a wait condition exists. A wait condition is determined by the wait select bits of the "data buffer control/byte count/command" in the PCL. A flag called "retry" is kept by the DMA in the DMA global register. The DMA uses this flag to keep track of when the wait condition should be evaluated as these wait conditions are ignored during retries.

Once the wait condition no longer exists, the DMA writes a control token to the FIFO indicating the beginning of a packet and enters a data movement phase. Here, a loop is entered where the current transfer count is checked to see if it has gone to zero. If so, a check is made to see if this is the last data buffer of the PCL buffer list. If there is another buffer in the PCL list, then the DMA will acquire the new buffer address and transfer count and proceed with transfer. While moving data into the asynchronous transmit FIFO from the PCI interface, the DMA will wait for the FIFO to have sufficient room before requesting the PCI bus master to perform a read transfer. The DMA will request a transfer of the PCI master with the bit count equal to the high watermark as defined with regard to the DMA receive operation. While the DMA is transferring data, the data buffer start address register and the data buffer transfer link bits in the DMA control register are updated to reflect the current state of the transfer.

When the last bit of data from a buffer has been transferred to the asynchronous transmit FIFO and the buffer is the last of the PCL list as indicated by the last buffer bit in the control/byte count PCL word, then the DMA knows that the end of the packet has been reached. If the previous packet address is valid, the DMA will delay checking status until there is a full packet queued in the transmit FIFO. This way, the return status is always for the previous packet, unless the wait for status bit is set. If there is only one packet in the transfer, then the previous and current packets are the same. If the previous packet address is valid, then the DMA will look at the packet counter. When a packet has been transmitted to the IEEE 1394 bus by the link layer controller and status for this packet is valid, the link layer controller will decrement the packet counter. The DMA will spin waiting for packet counter to go to zero indicating valid status is available for the previous packet. If the status indicates that the previous packet is to be retried, then the DMA sets a flush FIFO request to the link layer controller and then waits for the link layer controller to indicate the completion of the FIFO flush by the removal of the retry indication. The DMA then "backs up to" the previous packet and starts the transfer all over. If no retry occurred, then the DMA will update the DMA status register with the acknowledged status passed from the link layer controller, sets packet complete, and then write the completion status to memory in the previous PCL status word along with the number of bits transferred for the currently active PCL, which may not be relevant for the previous PCL. If the Interrupt bit is set in the PCL, then an interrupt is signaled and latched in the corresponding interrupt status register bit.

When the status has been checked, the DMA writes a special control token to the transmit FIFO to mark the end of the packet. The packet count is incremented to one to indicate to the link layer controller that the end of packet has been written by the DMA. The current PCL address is saved as the previous PCL address, and the previous packet control list start address register and a "previous valid" flag is set in the DMA global register. The DMA then determines whether another PCL has been linked to the current PCL by fetching the next list address value. If it is valid, then the DMA will make this the current PCL address and continue execution. If it is not valid or if the wait for status bit is set, then the DMA waits for the current packet to be transferred by the link layer controller. When valid status is available, as indicated by the packet counter decrementing to zero, the DMA checks to see if the packet is to be retried as indicated by a IEEE 1394 busy status. If so, the FIFO is flushed as before mentioned and the transmit is attempted again.

If there was a transmit timeout, retry overrun, or FIFO underrun, as indicated by the link layer controller, then the packet error bit is set in the DMA status register, along with the acknowledge status. The status is then updated in the PCL. In the event of a transmit timeout or retry overrun, it may be possible that the target node is no longer responding. The DMA addresses this situation by making it possible to skip around the PCL(s) which form the stream of data to this particular target note. Software can set the next PCL stream entry of the PCL to point to the first PCL to the next stream of transmit data (i.e., the next asynchronous transmits to another 1394 node). If the next PCL stream address is valid, then the DMA will continue execution with that PCL. If this address is not valid, then the DMA channel will go idle the same as at any time it encounters the next PCL address marked invalid. If this next stream feature is not to be used, then this value should be set to the same value as the next list address. If the DMA halts posting a DMA halt interrupt status and the next PCL stream entry is invalid, then rewriting the next PCL stream is necessary, since the DMA is in the get-next-stream state and the DMA is ignoring the next list address. Always setting the "next list address" and the "next PCL stream" to the same address is, therefore, required if the next stream feature is not to be used to prevent a hang in any asynchronous transmit channel that invokes the next PCL stream entry due to an error.

Figure 24A:
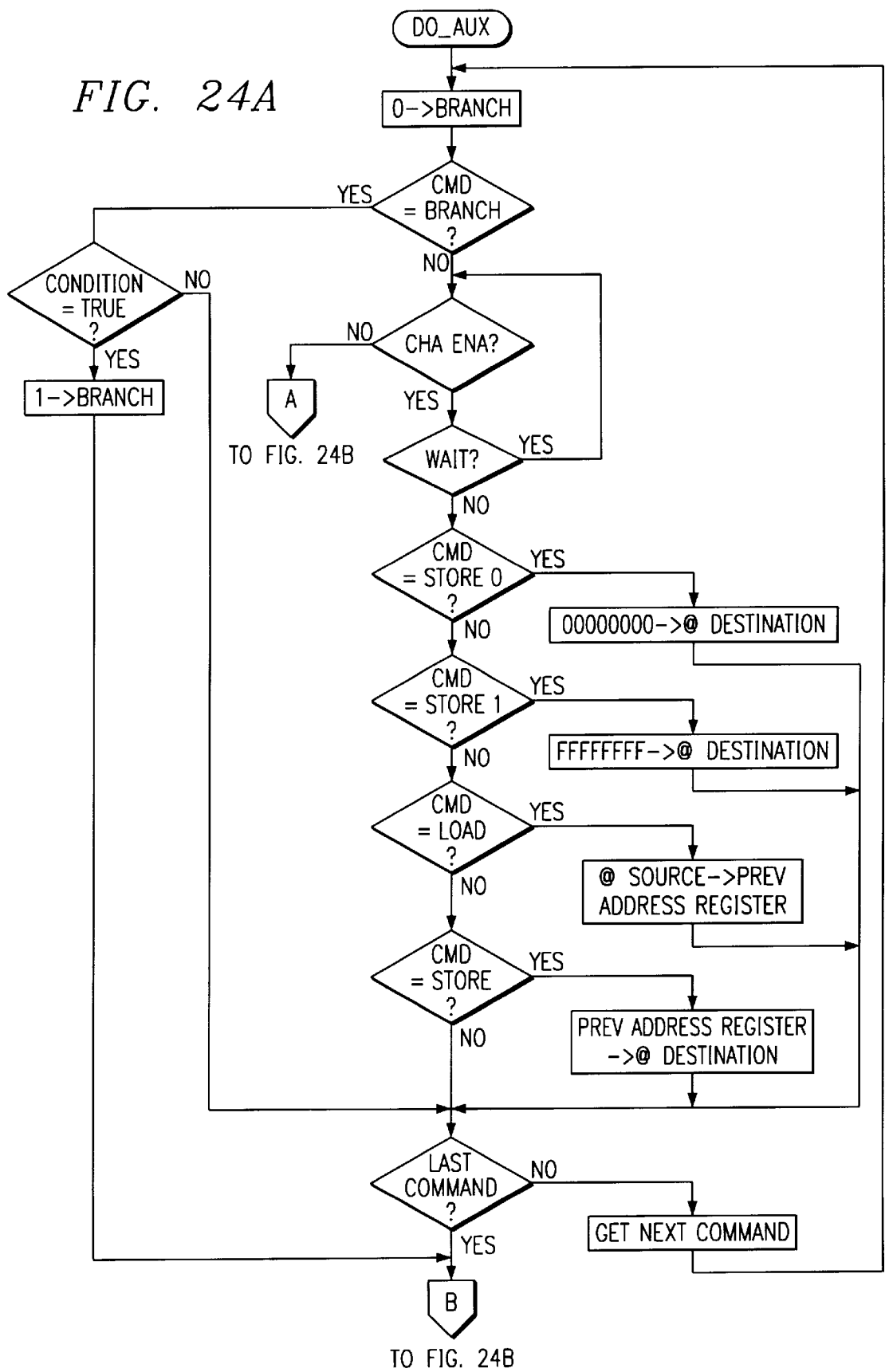

FIG. 24 shows a flow diagram similar to that described above for the asynchronous and isochronous transmit operations, but as applied to the auxiliary operations of DMA Engine 74.

Figure 25:
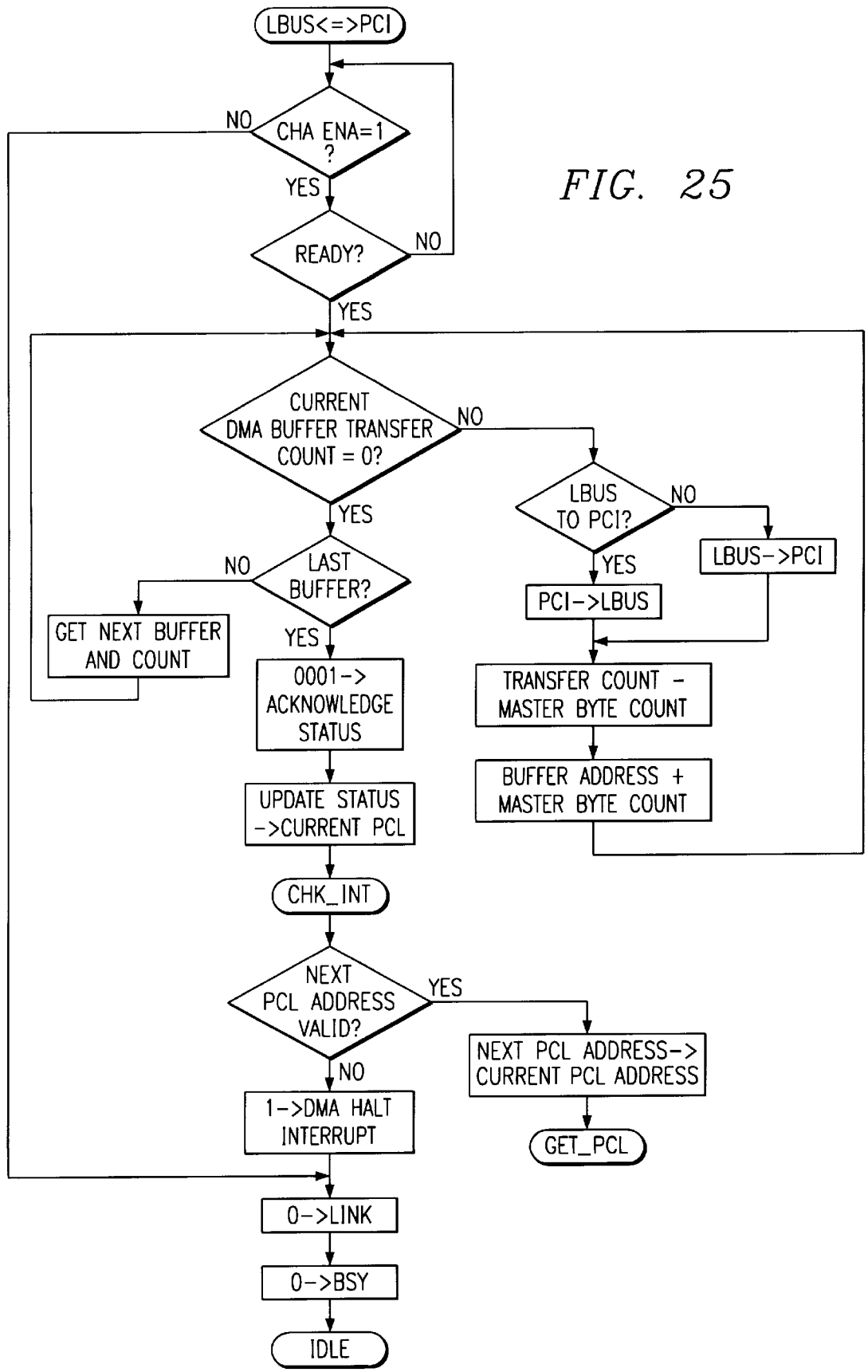
FIG. 25 shows a partial flow diagram of the DMA machine showing the local bus to/from PCI bus operation of the present invention.

The PCI to LOCAL Bus and LOCAL Bus to PCI Transfer operation, as FIG. 25 shows, controls the transfer of data between the PCI bus and the LOCAL Bus. The PCI address and the number of bits to transfer is derived from the PCL data buf ctl/bit_cnt/cmd word(s) in the PCL as for other transfer commands such as transmits. The difference is that the destination or source of the transfer is not the FIFO but rather the LOCAL bus. The LOCAL bus address is generated from the AUX_ADR register (see hardware register definitions).

A PCI to/from LOCAL operation will proceed by checking to see a wait condition exists. The wait condition is determined by the Wait Select bits of the data buf0 ctl/bit_ cnt/cmd at PCL offset 0x18. When the wait conditions no longer exist, the DMA enters a loop where the current transfer count is checked to see if it has gone to zero. If so, a check is made to see if this is the last data buffer of the PCL buffer list. If there is another buffer in the PCL list then the DMA will acquire the new buffer address and transfer count and proceed with the transfer. While the DMA is transferring data, the Data buffer start address register and the data buffer transfer length bits in the DMA control register are updated to reflect the current state of the transfer.

When the last bit of data from a buffer has been transferred to/from the LOCAL bus and the buffer is the last of the PCL list as indicated by the LAST BUF bit of the ctl/bit_cnt PCL word then the DMA knows that the end of the transfer has been reached. The DMA will update the DMA status register with status of 0x0001, the PKT CMP is set, and it is then written to the PCL status word at PCL offset 0xC along with the number of bytes transferred. If the INT bit is set in the data buf0 ctl/bit_cnt/cmd at PCL offset 0x18 then an interrupt is signaled and latched in the corresponding (DMA_PCL[x]) bit in the Interrupt Status register.

The DMA then determines whether another PCL has been linked to the current PCL by fetching the Next List Adr (PCL offset 0x00). If it is valid as indicated by bit 0=0 then the DMA will make this the current PCL address and continue execution as shown. If another PCL had not been linked to the current PCL as indicated by bit 0=1 the Link and BSY bits are cleared in the DMA control register, a DMA halted interrupt is generated for this channel with associated status (DMA_HLT[x]) in the Interrupt Status register, and the channel becomes idle.

Figure 26A:
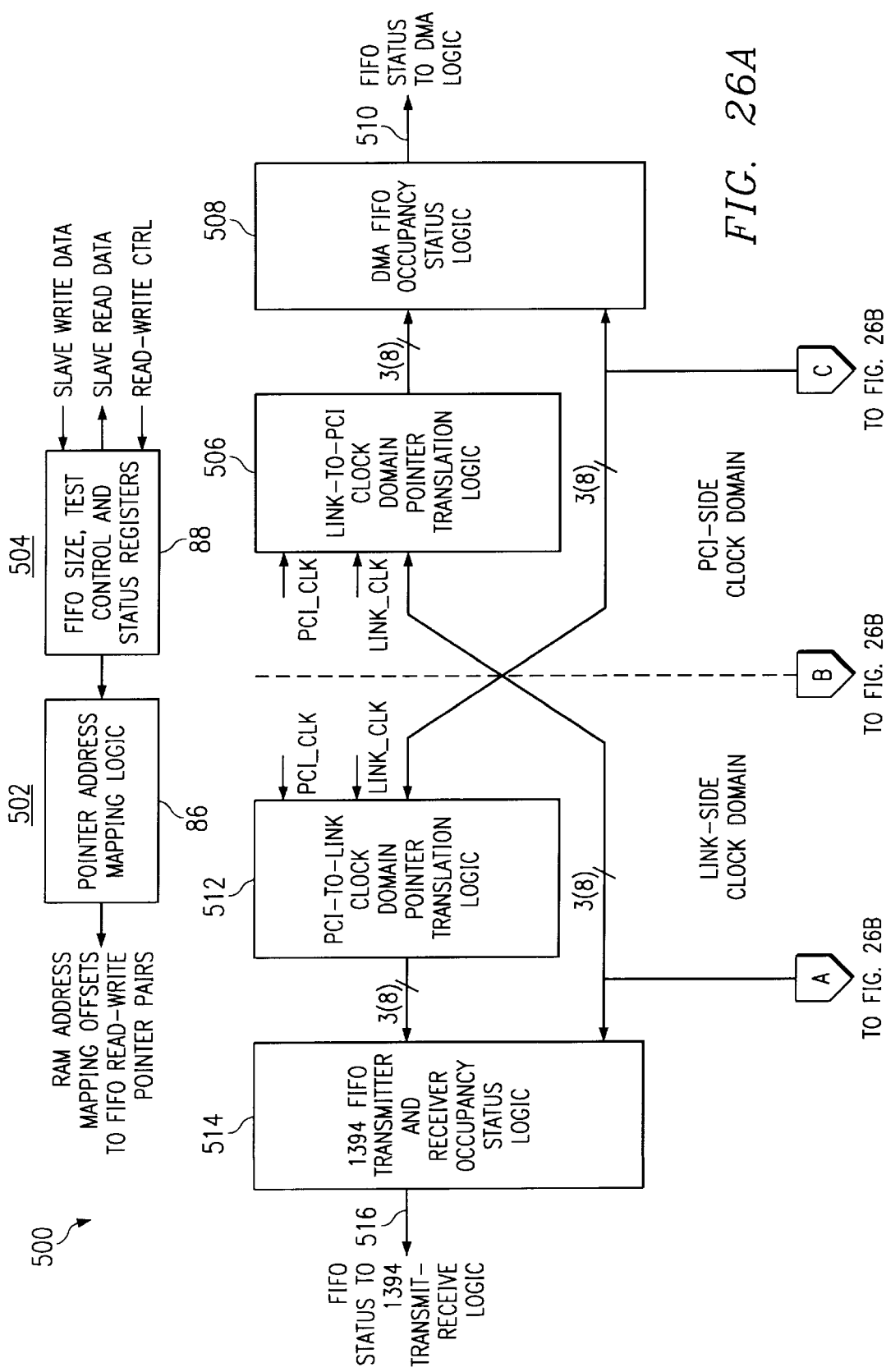

FIG. 26 shows a FIFO high level functional block diagram 500 to describe the operation of FIFOs for GRF 80, asynchronous transmit FIFO 82, and isochronous transmit FIFO 84. The FIFO logic of the present invention includes a link-side clock domain 502 and a PCI-side clock domain 504. In PCI-side clock domain 504, FIFO control and status registers 88 are real and written by the PCI bus interface logic. Also, FIFO controller status registers 88 provide input to pointer address mapping logic 86. Pointer address mapping logic 86 generates RAM address mapping offsets to FIFO read-write pointer pairs.

The dual port RAM 501 provides data storage for GRF 80, asynchronous transmit FIFO 82, and isochronous FIFO 84, and straddles the demarcation between link-side clock domain 502 and PCI-side clock domain 504. One PCI-side clock domain 504, clock domain pointer translation logic 506 generates an input to DMA FIFO occupancy status logic 508. DMA FIFO occupancy status logic 508 generates FIFO status to DMA logic signal 510. On link-side clock domain 502, clock domain pointer translation logic 512 provides input to 1394 FIFO transmitter and receiver occupancy status logic 514, which generates a FIFO status to 1394 transmit-receive logic signal 516.

Dual port RAM 501 receives address inputs from multiplexer 518 and multiplexer 520. Multiplexer 518 receives input from general receive write pointer 522, asynchronous transmit read pointer 524 and isochronous transmit read pointer 526. General receive write pointer 522 receives control from 1394 receiver and address mapping logic. Asynchronous transmit read pointer 524 and isochronous transmit read pointer 526 receive control from 1394 transmitter and address mapping logic. Output from general receive write pointer 522, asynchronous transmit read pointer 524, and isochronous transmit read pointer 526 all go to transmitter and receive occupancy status logic 514, clock domain pointer translation logic 506, and multiplexer 518.

General receive pointer 528, asynchronous transmit write pointer 530, and isochronous transmit write pointer 532 all receive control from DMA logic and address mapping logic. General receive read pointer 528, asynchronous transmit write pointer 530, and isochronous transmit write pointer 532 all provide output to DMA FIFO status logic 508, clock domain pointer translation logic 512, and multiplexer 520.

Dual port RAM 501 also receives data in from 1394 receive logic along 33-bit data bus 534, link clock 25 MHz signal 536, and control from 1394 transmit/receive logic at line 538. Also, control from 1394 transmit/receive logic 538 goes to link-side address multiplexer 518. Byte pack logic 540 receives DMA read data from host memory via control from DMA logic to provide output on 33-bit data bus 542 that goes to dual port RAM 501 PCI-side data input. Byte unpack logic 544 receives data out from dual port RAM 501 PCI-side data output 33-bit bus 546 to provide DMA write data to host memory. Also, control from DMA logic goes to byte unpack logic 544, multiplexer 520 and Dual port RAM 501. A zero to 33 MHz PCI clock signal goes to dual port RAM 501.

In conjunction with the description given in FIG. 2 in the accompanying text, the following description further detail regarding the function of the FIFOs, GRF 80, asynchronous transmit FIFO 82, and isochronous transmit FIFO 84.

FIFO status logic 514 and 516 implement the logic required to generate an occupancy status for each logical FIFO. In computing the PCI-side FIFO status, the link-to-PCI clock domain translation logic samples the current value of each pointer on the link side of the FIFO and translate these samples from the link clock domain over to the PCI clock domain. Each translated link-side pointer is compared to its corresponding PCI-side pointer to generate an occupancy status for each FIFO. This status is used by the DMA logic to pace the transfer of data between host memory and the FIFO. Similarly, in computing the link-side FIFO status, the PCI-to-link clock domain translation logic samples the current value of each pointer on the PCI-side of the FIFO and translate these samples from the PCI clock domain over to the link clock domain. Each translated PCI-side pointer is compared to its corresponding link-side pointer to compute an occupancy status for each FIFO. This status is used by the 1394 transmit-receive logic to pace the transfer of data between the 1394 bus and the FIFO.

Byte pack logic 540 implements the logic to assemble a full quadlet using data read from host memory on byte aligned addresses by the active DMA channel. The logic preferably includes four 8 bit-wide registers and four 8-to-1 multiplexers. Each register-mux pair corresponds to a byte lane. The input of each register connects to an input byte lane which is switched by the active DMA channel to host memory. The output of each mux connects to an output byte lane which drives the FIFO. For each 8-to-1 multiplexer, four inputs shall connect in a one-to-one correspondence to each register output. The remaining four inputs connect in a one-to-one correspondence to each register input. This configuration allows bit-aligned DMA read data from the four input byte lanes to be cross-point switched in a different order to the four output byte lanes. Control of the byte lane multiplexers is by the active DMA read channel.

Byte unpack logic 544 implements the logic required to disassemble the quadlet data read from the FIFO into individually selectable bytes for writing to host memory on byte-aligned addresses by the active DMA channel. This logic consists of four 8-bit-wide registers and four 8-to-1 multiplexers. Each register-mux pair corresponds to a byte lane. The input of each register connects to an input byte lane, which is driven from the FIFO. The output of each multiplexer connects to an output byte lane which is switched by the DMA channel to the host memory. For each of the 8-to-1 multiplexers, four inputs connect in a one-to-one correspondence to each register output. The remaining four inputs connect in a one-to-one correspondence to each register input. This configuration allows the quadlet read from the FIFO to be cross-point switched in a different order onto the output byte lanes. The control of the byte lane multiplexers is by the active DMA write channel.

Although the present invention has been described in detail, it should be understood that various changes, substitutions and alterations can be made hereto without departing from the spirit and scope of the invention as defined by the appended claims.

What is claimed is:

1. A method for operating a data packet transfer device in an autonomous mode, comprising the steps of:
    directing an autonomous boot mode select signal to the data transfer device;
    configuring registers associated with the data transfer device for autonomous operation of a data transfer device; and
    enabling a direct memory access associated with the data packet transfer device for transferring data to at least one program control list for operating said data packet transfer device in an autonomous mode.

2. The method of claim 1, further comprising the step of fetching an address of a first PCL using DMA channel zero.

3. The method of claim 1, further comprising the step of enabling a DMA master access to an external RPL ROM device.

4. The method of claim 1, further comprising the step of enabling DMA master access to an external PCI interface device.

5. The method of claim 1, further comprises the step of controlling said data packet transfer device to execute a PCI memory command according to the autonomous boot mode select signal.

6. The method of claim 1, further comprises the step of controlling said data packet transfer device to execute a PCI I/O command according to the autonomous boot mode select signal.

7. The method of claim 1, further comprising the step of controlling said data packet transfer device to execute a PCI configuration command according to the autonomous boot mode select signal.

8. An autonomous boot circuit for operating a data packet transfer device in an autonomous mode, comprising:
    directing circuitry for directing an autonomous boot mode select signal to the data transfer device;
    instructions for configuring registers associated with the data transfer device for autonomous operation of a data transfer device; and
    said directing circuitry further associated with the data packet transfer device for transferring data to at least one program control list for operating said data packet transfer device in an autonomous mode.

9. The autonomous boot circuit of claim 8, further comprising circuitry for fetching an autonomous boot circuit address of a first PCL using DMA channel zero.

10. The autonomous boot circuit of claim 8, further comprising circuitry for enabling a DMA master access to an external RPL ROM device.

11. The autonomous boot circuit of claim 8, further comprising circuitry for enabling DMA master access to an external PCI interface device.

12. The autonomous boot circuit of claim 8, further comprising circuitry for controlling said data packet transfer device to execute a PCI memory command according to the autonomous boot mode select signal.

13. The autonomous boot circuit of claim 8, further comprising circuitry for controlling said data packet transfer device to execute a PCI I/O command according to the autonomous boot mode select signal.

14. The autonomous boot circuit of claim 8, further comprising circuitry for controlling said data packet transfer device to execute a PCI configuration command according to the autonomous boot mode select signal.

15. A personal computer environment, comprising:
at least one peripheral employing a data packet transfer bus;
a computer, said computer comprising:
a host cpu comprising a PCI bus; and
a PCI-interface device for providing an interface between said PCI bus and said peripheral, said PCI-interface device comprising an autonomous boot circuit for operating a data packet transfer device in an autonomous mode, said autonomous boot circuit comprising:
directing circuitry for directing an autonomous boot mode select signal to the data transfer device;
instructions for configuring registers associated with the data transfer device for autonomous operation of a data transfer device; and
said directing circuitry further associated with the data packet transfer device for transferring data to at least one program control list for operating said data packet transfer device in an autonomous mode.

16. The autonomous boot circuit of claim 15, further comprising circuitry for fetching an autonomous boot circuit address of a first PCL using DMA channel zero.

17. The autonomous boot circuit of claim 15, further comprising circuitry for enabling a DMA master access to an external RPL ROM device.

18. The autonomous boot circuit of claim 15, further comprising circuitry for enabling DMA master access to an external PCI interface device.

19. The autonomous boot circuit of claim 15, further comprising circuitry for controlling said data packet transfer device to execute a PCI memory command according to the autonomous boot mode select signal.

20. The autonomous boot circuit of claim 15, further comprising circuitry for controlling said data packet transfer device to execute a PCI I/O command according to the autonomous boot mode select signal.

* * * * *